US012645922B2

(12) United States Patent
Khanna

(10) Patent No.: US 12,645,922 B2
(45) Date of Patent: Jun. 2, 2026

(54) MACHINE LEARNING SYSTEMS AND METHODS FOR CLASSIFICATION BASED AUTO-ANNOTATION

(71) Applicant: Fortinet, Inc., Sunnyvale, CA (US)

(72) Inventor: Sameer T. Khanna, Cupertino (CA)

(73) Assignee: FORTINET, INC., Sunnyvale, CA (US)

( * ) Notice: Subject to any disclaimer, the term of this patent is extended or adjusted under 35 U.S.C. 154(b) by 917 days.

(21) Appl. No.: 17/347,808

(22) Filed: Jun. 15, 2021

(65) Prior Publication Data

US 2022/0398491 A1    Dec. 15, 2022

(51) Int. Cl.
*G06N 3/047* (2023.01)
*G06F 16/28* (2019.01)
*G06F 17/16* (2006.01)
*G06F 17/18* (2006.01)
*G06N 3/045* (2023.01)
*G06N 3/08* (2023.01)
*G06N 20/00* (2019.01)

(52) U.S. Cl.
CPC ........... *G06N 3/047* (2023.01); *G06F 16/285* (2019.01); *G06F 17/16* (2013.01); *G06F 17/18* (2013.01); *G06N 3/045* (2023.01); *G06N 3/08* (2013.01); *G06N 20/00* (2019.01)

(58) Field of Classification Search
CPC ........ G06N 3/047; G06N 20/00; G06N 3/045; G06N 3/08; G06F 16/285; G06F 17/16; G06F 17/18
See application file for complete search history.

(56) References Cited

U.S. PATENT DOCUMENTS

| | | | |
|---|---|---|---|
| 8,813,236 | B1 | 8/2014 | Saha |
| 9,027,077 | B1 | 5/2015 | Bharali |
| 9,444,829 | B1 | 9/2016 | Ashley |

(Continued)

OTHER PUBLICATIONS

Lopes, L. A., Machado, V. P., Rabêlo, R. A., Fernandes, R. A., & Lima, B. V. (May 2016). Automatic labelling of clusters of discrete and continuous data with supervised machine learning. Knowledge-Based Systems, 106, 231-241. (Year: 2016).*

(Continued)

*Primary Examiner* — Michael J Huntley
*Assistant Examiner* — Maggie Thanh Maido
(74) *Attorney, Agent, or Firm* — Jaffery Watson Hamilton & DeSanctis LLP

(57) ABSTRACT

Among a great deal of other disclosure and scope, systems and methods are enclosed that enable automated labelling of a subset of vectors in a given problem space. For example, in some of many cases, a first machine learning model pre-trained on a given problem space makes predictions regarding fresh, unseen data. In addition to this prediction, the model can output a confidence metric indicating its confidence regarding the prediction made. A subset of these vectors with the highest confidence may be selected. Relevant heuristics assessing each vector in the subset may be computed. These heuristics can be fed through a second machine learning model, which identifies if the given prediction made by the first model is correct. If so, the vector is automatically annotated with the correct predicted label, the vector is appended to the labeled set of data, and the first model is retrained with the new labeled set of data.

18 Claims, 16 Drawing Sheets

(56) References Cited

U.S. PATENT DOCUMENTS

| | | | |
|---|---|---|---|
| 10,579,407 | B2 | 3/2020 | Ahuja et al. |
| 10,944,723 | B2 | 3/2021 | Ahuja |
| 11,120,148 | B2 | 9/2021 | Sreedhar et al. |
| 2007/0136788 | A1 | 6/2007 | Monahan |
| 2009/0103524 | A1 | 4/2009 | Mantripragada et al. |
| 2009/0132447 | A1 | 5/2009 | Milenova et al. |
| 2010/0005505 | A1 | 1/2010 | Gottimukkala |
| 2011/0138441 | A1 | 6/2011 | Neystadt |
| 2011/0196870 | A1* | 8/2011 | Schmidtler ............ G16H 10/60 |
| | | | 707/E17.046 |
| 2012/0284213 | A1 | 11/2012 | Lin |
| 2014/0156814 | A1 | 6/2014 | Barabash |
| 2014/0280152 | A1 | 9/2014 | Jun |
| 2014/0280946 | A1 | 9/2014 | Mukherjee |
| 2015/0256413 | A1 | 9/2015 | Du |
| 2016/0028762 | A1 | 1/2016 | Di Pietro et al. |
| 2016/0034269 | A1 | 2/2016 | Furuchi |
| 2016/0062754 | A1 | 3/2016 | Tripp |
| 2016/0112270 | A1 | 4/2016 | Danalt |
| 2016/0267329 | A1 | 9/2016 | Fan |
| 2016/0344772 | A1 | 11/2016 | Monohan |
| 2016/0359680 | A1 | 12/2016 | Parandehgheibi |
| 2016/0359740 | A1 | 12/2016 | Parandehgheibi |
| 2016/0359915 | A1 | 12/2016 | Gupta |
| 2017/0124409 | A1 | 5/2017 | Choi et al. |
| 2017/0126834 | A1 | 5/2017 | Fransen |
| 2017/0207980 | A1 | 7/2017 | Hudis |
| 2017/0237778 | A1 | 8/2017 | DiGiamattista |
| 2017/0272442 | A1 | 9/2017 | Klimovs et al. |
| 2017/0324765 | A1 | 11/2017 | McLaughling |
| 2017/0330109 | A1* | 11/2017 | Maughan ................ G06N 5/04 |
| 2017/0339178 | A1 | 11/2017 | Hahaffey |
| 2018/0027006 | A1 | 1/2018 | Zimmermann |
| 2018/0069899 | A1 | 3/2018 | Lang |
| 2018/0103052 | A1 | 4/2018 | Chondhury |
| 2018/0247188 | A1 | 8/2018 | Wong |
| 2018/0278496 | A1 | 9/2018 | Kulshreshtha |
| 2018/0287907 | A1 | 10/2018 | Kulshreshtha |
| 2018/0373462 | A1 | 12/2018 | Childress |
| 2019/0036950 | A1 | 1/2019 | Isola |
| 2019/0171428 | A1* | 6/2019 | Patton ....................... G06F 8/60 |
| 2019/0362257 | A1 | 11/2019 | Luo |
| 2019/0370219 | A1 | 12/2019 | Efstathiou et al. |
| 2020/0034645 | A1 | 1/2020 | Fan et al. |
| 2020/0265270 | A1 | 8/2020 | Boudreau et al. |
| 2020/0285939 | A1 | 9/2020 | Baker |
| 2020/0296134 | A1 | 9/2020 | Sreedhar et al. |
| 2021/0042570 | A1* | 2/2021 | Iskandar ............. G06F 11/3075 |
| 2021/0126948 | A1 | 4/2021 | Nedbal et al. |
| 2021/0142181 | A1 | 5/2021 | Lui |
| 2021/0150340 | A1 | 5/2021 | Liu et al. |
| 2021/0287141 | A1 | 9/2021 | Molloy et al. |
| 2021/0336977 | A1 | 10/2021 | Udupi Raghavendra et al. |
| 2022/0067580 | A1 | 3/2022 | Rho |
| 2022/0092472 | A1 | 3/2022 | Sharma |
| 2022/0101112 | A1 | 3/2022 | Brown et al. |
| 2022/0114593 | A1* | 4/2022 | Johnson ............ G06F 18/24133 |
| 2022/0398436 | A1 | 12/2022 | Khanna |
| 2022/0398453 | A1 | 12/2022 | Khanna |
| 2022/0398493 | A1 | 12/2022 | Khanna |
| 2022/0398494 | A1 | 12/2022 | Khanna |
| 2023/0028237 | A1 | 1/2023 | Wei |
| 2023/0073669 | A1 | 3/2023 | O'Connor |

OTHER PUBLICATIONS

Khanna, "Learning to Learn: A Dual Network Approach to Multi-Class Active Learning" CS230 Winter 2021 <URL: http://cs230.stanford.edu/past-projects/> Retrieved Jan. 26, 2022.

Office Action for U.S. Appl. No. 17/492,481 mailed Jul. 29, 2024, 55 pages.

Office Action for U.S. Appl. No. 17/378,613 mailed Jul. 29, 2024, 44 pages.

Ge, L., & Parhi, K. K. (Jun. 2020). Classification using hyperdimensional computing: A review. IEEE Circuits and Systems Magazine, 20(2), 30-47. (Year: 2020).

Grzegorczyk, K., Kurdziel, M., & Wojcik, P. I. (May 2016). Encouraging orthogonality between weight vectors in pretrained deep neural networks. Neurocomputing, 202, 84-90. (Year: 2016).

Hao, Y., Wang, N., Li, J., & Gao, X. (Jul. 2019). HSME: Hypersphere manifold embedding for visible thermal person re-identification. In Proceedings of the AAAI conference on artificial intelligence (vol. 33, No. 01, pp. 8385-8392). (Year: 2019).

Knyazev, AV., & Argentati, M. E. (Feb. 2002). Principal angles between subspaces in an A-based scalar product: algorithms and perturbation estimates. SIAM Journal on Scientific Computing, 23(6), 2008-2040. (Year: 2002).

Office action for U.S. Appl. No. 17/378,616 mailed Dec. 17, 2024, 33 pages.

Tuia, D., Volpi, M., Copa, L., Kanevski, M., & Munoz-Mari, J. (Jun. 2011). A survey of active learning algorithms for supervised remote sensing image classification. IEEE Journal of Selected Topics in Signal Processing, 5(3), 606-617. (Year: 2011).

Xie, P., Deng, Y., Zhou, Y., Kumar, A, Yu, Y., Zou, J., & Xing, E. P. (Jul. 2017). Learning latent space models with angular constraints. In International Conference on Machine Learning (pp. 3799-3810). PMLR. (Year: 2017).

Demidova, L. A., & Gorchakov, A. V. (Jan. 2021). Application of chaotic Fish School Search optimization algorithm with exponential step decay in neural network loss function optimization. Procedia Computer Science, 186, 352-359. (Year: 2021).

Final Office Action for U.S. Appl. No. 17/492,481, mailed Jan. 15, 2025, 63 pages.

Galloway, A, Tanay, T., & Taylor, G. W. (Jul. 2018). Adversarial training versus weight decay. arXiv preprint arXiv: 1804.03308. (Year: 2018).

Huang, T., Zhang, Z., & Zhang, J. (Sep. 2019). Fi Bi NET: combining feature importance and bilinear feature interaction for click-through rate prediction. In Proceedings of the 13th ACM conference on recommender systems (pp. 169-177). (Year: 2019).

Jing, L., & Ng, M. K. (Dec. 2013). Sparse label-indicator optimization methods for image classification. IEEE transactions on image processing, 23(3), 1002-1014. (Year: 2013).

Office Action for U.S. Appl. No. 17/492,473 Nov. 14, 2024, 37 pages.

Wang, Z., Liu, X., & Chen, W. (Dec. 2018). An Initialization Method of B-Spline Transformation for Medical Atlases Alignment. In 2018 15th International Computer Conference on Wavelet Active Media Technology and Information Processing (ICCWAMTIP) (pp. 138-141). IEEE. (Year: 2018).

Balakrishnan, S., Xu, M., Krishnamurthy, A, & Singh, A (Dec. 2011). Noise thresholds for spectral clustering. Advances in Neural Information Processing Systems, 24. (Year: 2011) , 9 pages.

Ding, Z., & Fei, M. (Sep. 2013). An anomaly detection approach based on isolation forest algorithm for streaming data using sliding window. IFAC Proceedings Volumes, 46(20), 12-17. (Year: 2013).

Dos Santos Teixeira, P. H., & Milidiu, R. L. (Mar. 2010). Data stream anomaly detection through principal subspace tracking. In Proceedings of the 2010 ACM Symposium on Applied Computing (pp. 1609-1616). (Year: 2010).

Final Office Action for U.S. Appl. No. 17/378,616 mailed May 16, 2025, 46 pages.

Hu, W., Miyata, T., Tokui, S., Matsumoto, E., & Sugiyama, M. (Jul. 2017). Learning discrete representations via information maximizing self-augmented training. In International conference on machine learning (pp. 1558-1567). PMLR. (Year: 2017).

Office Action for U.S. Appl. No. 17/378,613 mailed Jun. 13, 2025, 58 pages.

Office action for U.S. Appl. No. 17/492,481 mailed Jun. 30, 2025, 70 pages.

Su, H., Du, P., & Du, Q. (Jul. 2012). Semi-supervised dimensionality reduction using orthogonal projection divergence-based clustering for hyperspectral imagery. Optical Engineering, 51 (11), 111715-111715. (Year: 2012).

Tu, B., Zhang, X., Kang, X., Zhang, G., & Li, S. (Oct. 2018). Density peak-based noisy label detection for hyperspectral image

(56)          References Cited

OTHER PUBLICATIONS classification. IEEE Transactions on Geoscience and Remote Sensing, 57(3), 1573-1584. (Year: 2018).

Arnas, D., Leake, C., & Mortari, D. (Dec. 2019). The n-dimensional k-vector and its application to orthogonal range searching. Applied mathematics and computation, 372, 125010. (Year: 2019).

Final Office Action for U.S. Appl. No. 17/492,481 mailed Jan. 5, 2026, 30 pages.

Office Action for U.S. Appl. No. 17/378,616 mailed Dec. 5, 2025, 53 pages.

Wu, W., Huang, Y., Kurachi, R., Zeng, G., Xie, G., Li, R., & Li, K. (Aug. 2018). Sliding window optimized information entropyanalysis method for intrusion detection on in-vehicle networks. IEEE Access, 6, 45233-45245. (Year: 2018).

You, C., Robinson, D. P., & Vidal, R. (May 2016). Scalable Sparse Subspace Clustering by Orthogonal Matching Pursuit. arXiv preprint arXiv:1507.01238. (Year: 2016).

* cited by examiner

160

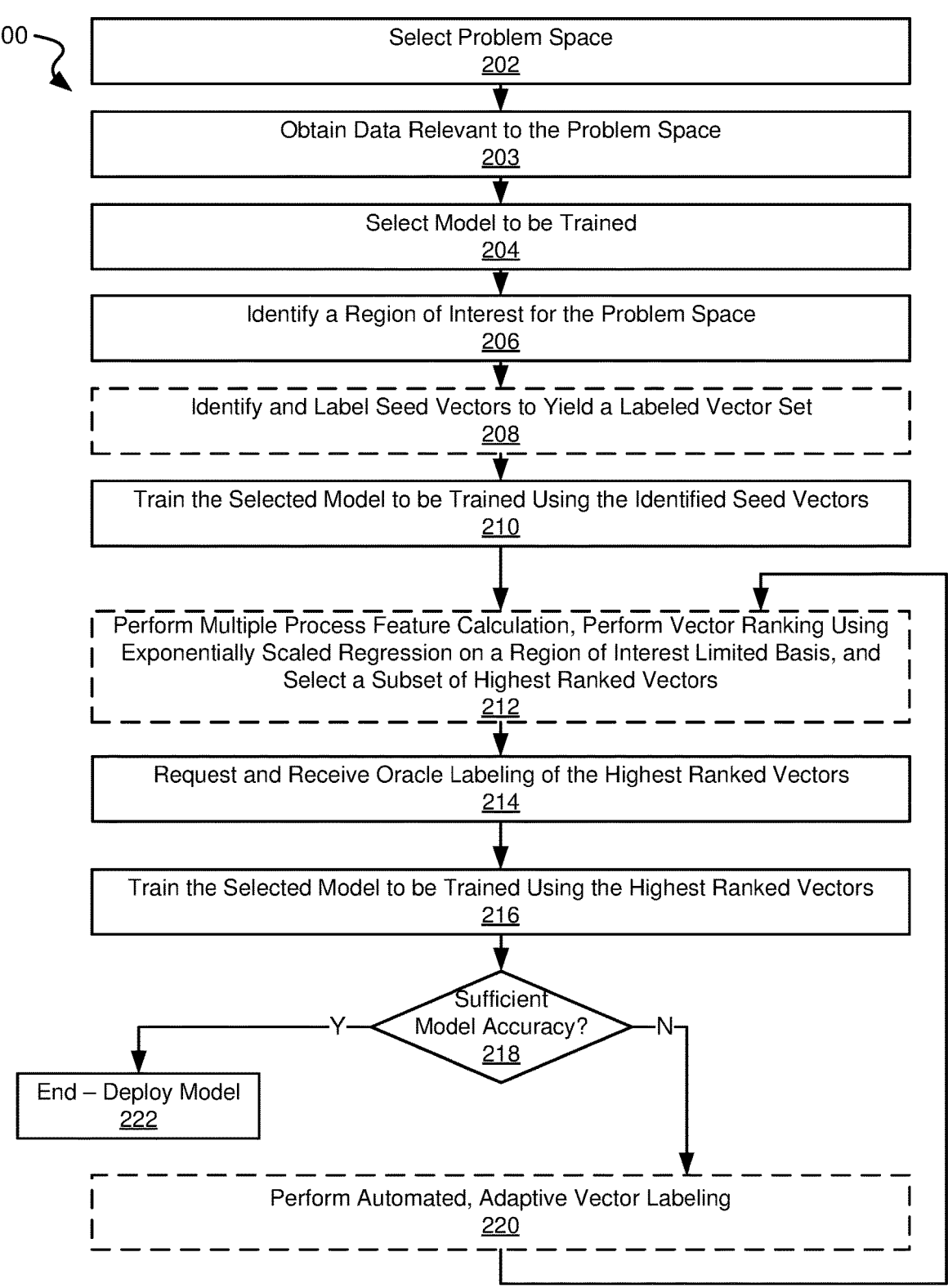

200

Select Problem Space
202

Obtain Data Relevant to the Problem Space
203

Select Model to be Trained
204

Identify a Region of Interest for the Problem Space
206

Identify and Label Seed Vectors to Yield a Labeled Vector Set
208

Train the Selected Model to be Trained Using the Identified Seed Vectors
210

Perform Multiple Process Feature Calculation, Perform Vector Ranking Using Exponentially Scaled Regression on a Region of Interest Limited Basis, and Select a Subset of Highest Ranked Vectors
212

Request and Receive Oracle Labeling of the Highest Ranked Vectors
214

Train the Selected Model to be Trained Using the Highest Ranked Vectors
216

Sufficient Model Accuracy?
218

—Y—    —N—

End – Deploy Model
222

Perform Automated, Adaptive Vector Labeling
220

| 18 Inputs |
|---|

3 Tanh Density Connected
Network Units 704

3 Tanh DRU
706

3 Tanh DRU
708

5 Tanh Density Connected Units
710

5 Tanh DRU
712

5 Tanh DRU
714

Rectified Linear Unit Output
716

900

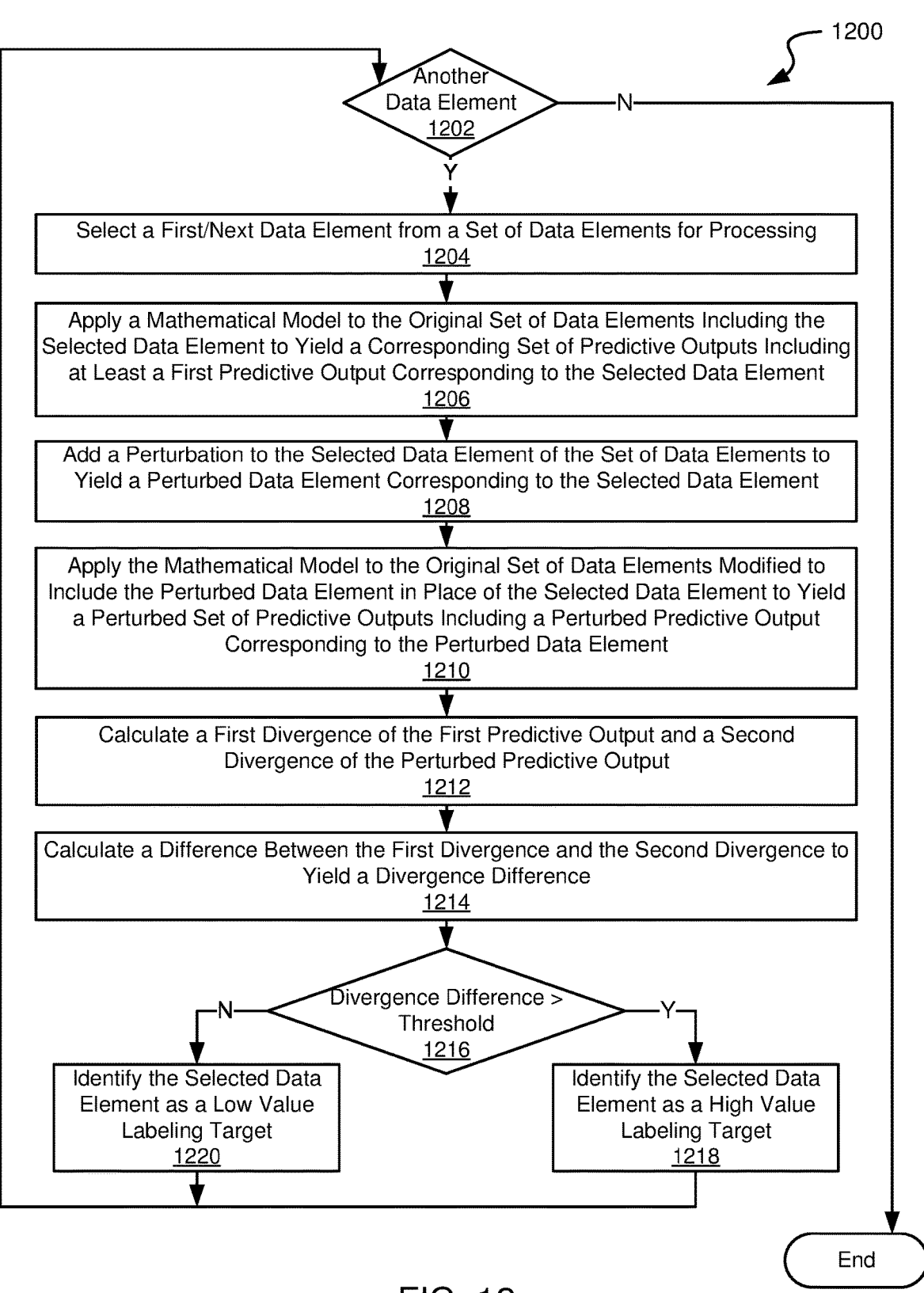

1200

Another Data Element
1202

Select a First/Next Data Element from a Set of Data Elements for Processing
1204

Apply a Mathematical Model to the Original Set of Data Elements Including the Selected Data Element to Yield a Corresponding Set of Predictive Outputs Including at Least a First Predictive Output Corresponding to the Selected Data Element
1206

Add a Perturbation to the Selected Data Element of the Set of Data Elements to Yield a Perturbed Data Element Corresponding to the Selected Data Element
1208

Apply the Mathematical Model to the Original Set of Data Elements Modified to Include the Perturbed Data Element in Place of the Selected Data Element to Yield a Perturbed Set of Predictive Outputs Including a Perturbed Predictive Output Corresponding to the Perturbed Data Element
1210

Calculate a First Divergence of the First Predictive Output and a Second Divergence of the Perturbed Predictive Output
1212

Calculate a Difference Between the First Divergence and the Second Divergence to Yield a Divergence Difference
1214

Divergence Difference > Threshold
1216

Identify the Selected Data Element as a Low Value Labeling Target
1220

Identify the Selected Data Element as a High Value Labeling Target
1218

End

FIG. 12

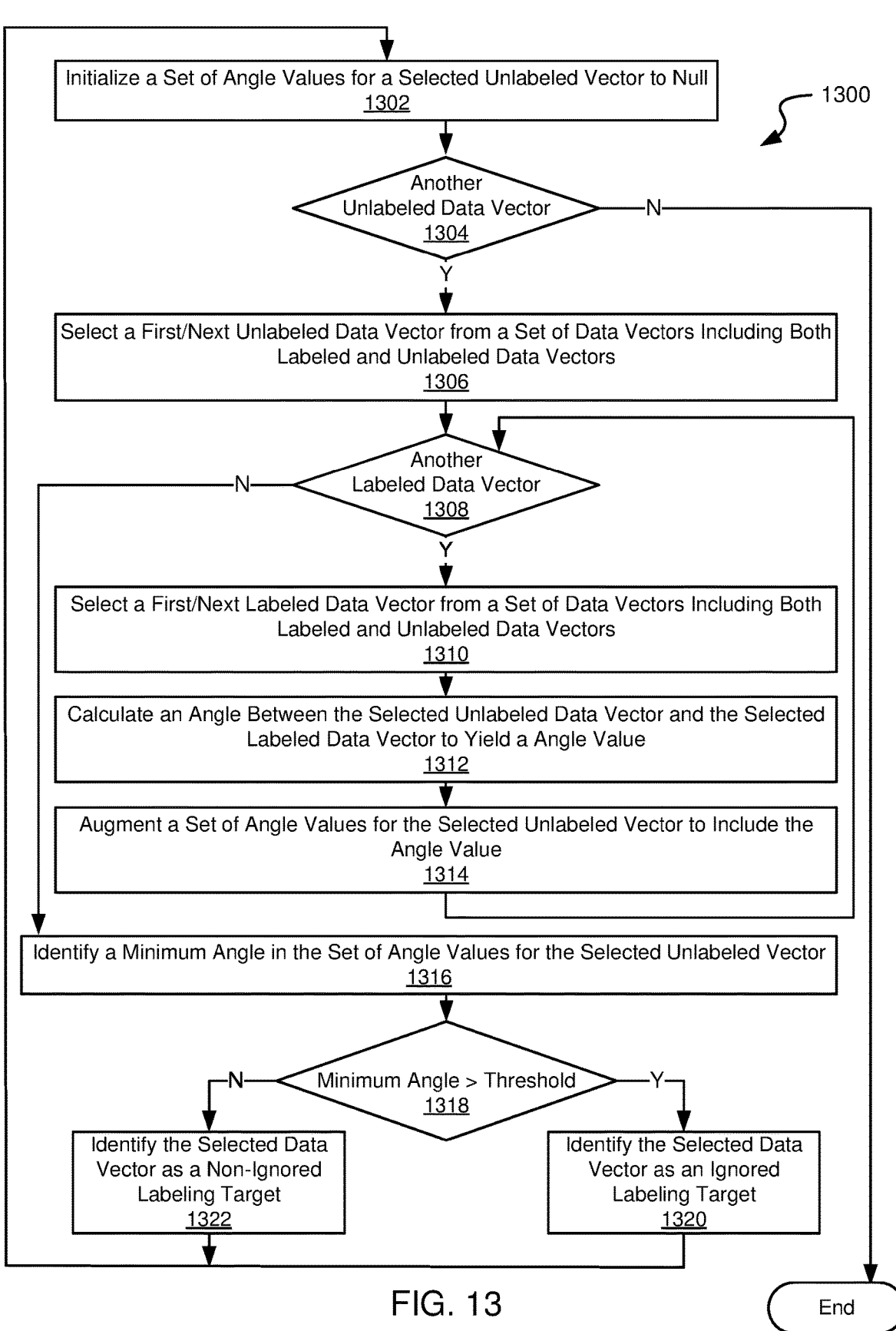

Initialize a Set of Angle Values for a Selected Unlabeled Vector to Null
1302

1300

Another
Unlabeled Data Vector
1304

N

Y

Select a First/Next Unlabeled Data Vector from a Set of Data Vectors Including Both
Labeled and Unlabeled Data Vectors
1306

Another
Labeled Data Vector
1308

N

Y

Select a First/Next Labeled Data Vector from a Set of Data Vectors Including Both
Labeled and Unlabeled Data Vectors
1310

Calculate an Angle Between the Selected Unlabeled Data Vector and the Selected
Labeled Data Vector to Yield a Angle Value
1312

Augment a Set of Angle Values for the Selected Unlabeled Vector to Include the
Angle Value
1314

Identify a Minimum Angle in the Set of Angle Values for the Selected Unlabeled Vector
1316

Minimum Angle > Threshold
1318

N

Y

Identify the Selected Data
Vector as a Non-Ignored
Labeling Target
1322

Identify the Selected Data
Vector as an Ignored
Labeling Target
1320

End

FIG. 13

MACHINE LEARNING SYSTEMS AND METHODS FOR CLASSIFICATION BASED AUTO-ANNOTATION

COPYRIGHT NOTICE

BACKGROUND

Field

Embodiments of the present disclosure generally relate to machine learning, and more particularly to systems and methods for identifying vectors for labeling for a learning model.

Description of the Related Art

Supervised learning involves manual labeling of large amounts of data to properly train machine learning models. Such an approach, while effective in developing helpful models, is often cost prohibitive. Active learning on the other hand seeks to reduce the number of labels needed to meaningfully train a model. Such active learning relies on actively selecting queries to direct labeling. While active learning can reduce the cost of labeling, there is no guarantee that it will work for a particular problem space under consideration. Indeed, research has shown that in some cases active labeling can actually require the labeling of more data than randomly applied data labeling.

Hence, there exists a need in the art for improved approaches for labeling.

SUMMARY

Embodiments of the present disclosure generally relate to machine learning, and more particularly to systems and methods for identifying vectors for labeling for a learning model.

This summary provides only a general outline of some embodiments. Many other objects, features, advantages and other embodiments will become more fully apparent from the following detailed description, the appended claims and the accompanying drawings and figures.

BRIEF DESCRIPTION OF THE DRAWINGS

In the figures, similar components and/or features may have the same reference label. Further, various components of the same type may be distinguished by following the reference label with a second label that distinguishes among the similar components. If only the first reference label is used in the specification, the description applies to any one of the similar components having the same first reference label irrespective of the second reference label.

FIG. 2 is a flow diagram showing a method in accordance with various embodiments for machine learning model development;

FIG. 12 is a flow diagram showing another method in accordance with various embodiments for using perturbation to identify high value labeling targets; and FIG. 13 is a flow diagram showing a method in accordance with some embodiments for using an orthogonality heuristic to identify high value labeling targets.

DETAILED DESCRIPTION

Figure 1A:
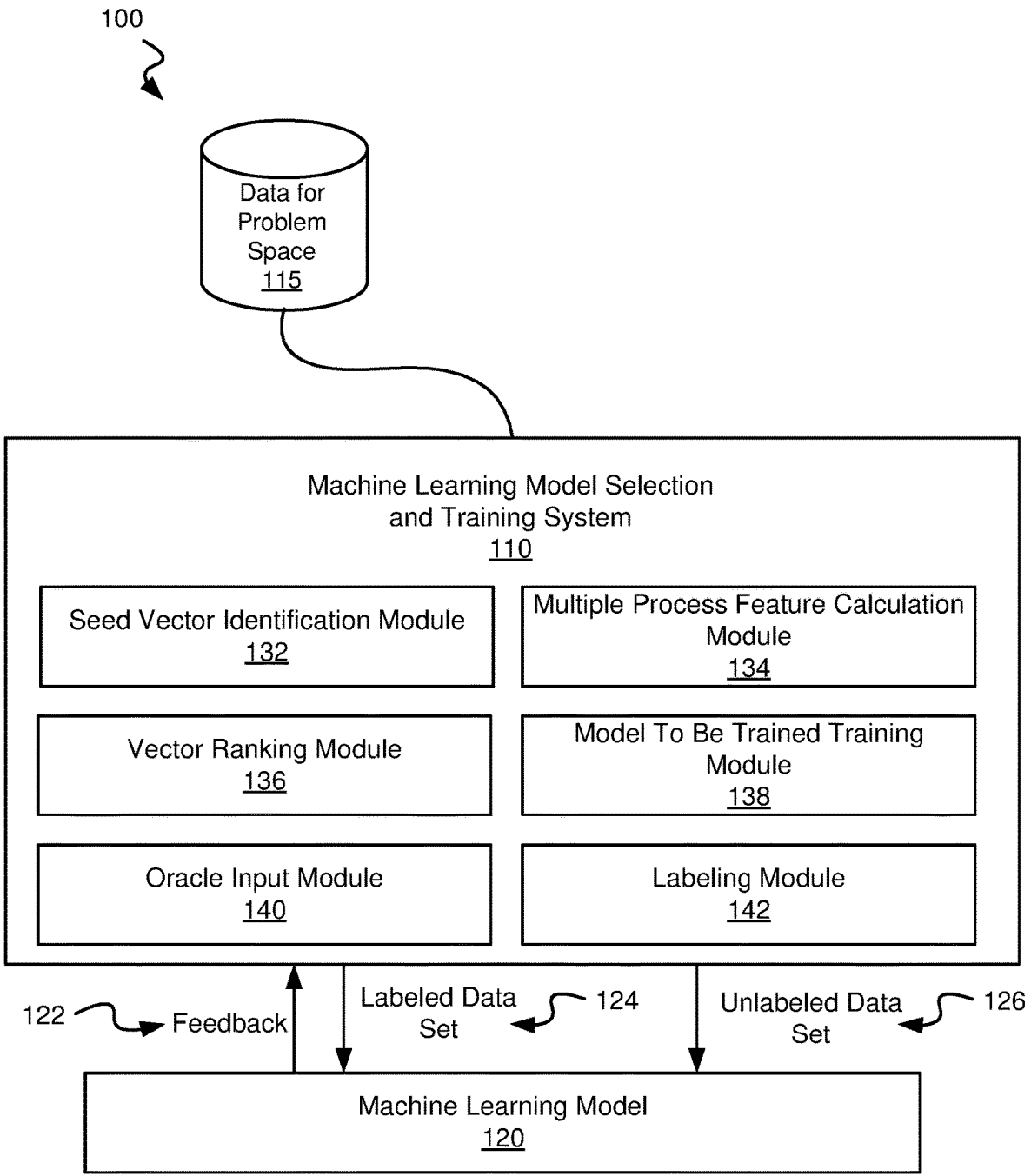
FIGS. 1A-1B illustrate an example system in which a machine learning model training system may be deployed in accordance with some embodiments.

Embodiments of the present disclosure generally relate to machine learning, and more particularly to systems and methods for identifying vectors for labeling for a learning model.

It has been found that the issue with traditional active learning is that it focuses on a singular, model specific strategy. While this approach works for many problem spaces, each model specific strategy has limitations, such as: uncertainty sampling's susceptibility to choose outliers, and query-by-committee approaches focusing on non-consequential regions of the problem space. Various embodiments set forth herein utilize multiple heuristics as part of identifying vectors for labeling.

Such systems and methods may be used in relation to a variety of problem spaces to train machine learning models that can be deployed in a large number of applications. Such applications may include, but are not limited to, surveillance systems or network security appliances. Based upon the disclosure provided herein, one of ordinary skill in the art will recognize a variety of applications into which machine learning models trained in accordance with embodiments discussed herein may be deployed.

Embodiments of the present disclosure include various processes, which will be described below. The processes may be performed by hardware components or may be embodied in machine-executable instructions, which may be used to cause a general-purpose or special-purpose processor programmed with the instructions to perform the steps. Alternatively, steps may be performed by a combination of hardware, software, firmware, and/or by human operators.

Various embodiments may be provided as a computer program product, which may include a machine-readable storage medium tangibly embodying thereon instructions, which may be used to program the computer (or other electronic devices) to perform a process. The machine-readable medium may include, but is not limited to, fixed (hard) drives, magnetic tape, floppy diskettes, optical disks, compact disc read-only memories (CD-ROMs), and mag-neto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other types of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within the single computer) and storage systems containing or having network access to a computer program(s) coded in accordance with various methods described herein, and the method steps of the disclosure could be accomplished by modules, routines, subroutines, or subparts of a computer program product.

In the following description, numerous specific details are set forth in order to provide a thorough understanding of example embodiments. It will be apparent, however, to one skilled in the art that embodiments described herein may be practiced without some of these specific details Terminology Brief definitions of terms used throughout this application are given below.

The terms "connected" or "coupled" and related terms are used in an operational sense and are not necessarily limited to a direct connection or coupling. Thus, for example, two devices may be coupled directly or via one or more inter-mediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may," "can," "could," or "might" be included or have a character-istic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclo-sure and may be included in more than one embodiment of the present disclosure. Importantly, such phrases do not necessarily refer to the same embodiment.

As used herein, a "surveillance system" or a "video surveillance system" generally refers to a system including one or more video cameras coupled to a network. The audio and/or video captured by the video cameras may be live monitored and/or transmitted to a central location for record-ing, storage, and/or analysis. In some embodiments, a net-work security appliance may perform video analytics on video captured by a surveillance system and may be con-sidered to be part of the surveillance system.

As used herein, a "network security appliance" or a "network security device" generally refers to a device or appliance in virtual or physical form that is operable to perform one or more security functions. Some network security devices may be implemented as general-purpose computers or servers with appropriate software operable to perform one or more security functions. Other network security devices may also include custom hardware (e.g., one or more custom Application-Specific Integrated Circuits (ASICs)). A network security device is typically associated with a particular network (e.g., a private enterprise network) on behalf of which it provides one or more security func-tions. The network security device may reside within the particular network that it is protecting, or network security may be provided as a service with the network security device residing in the cloud. Non-limiting examples of security functions include authentication, next-generation firewall protection, antivirus scanning, content filtering, data privacy protection, web filtering, network traffic inspection (e.g., secure sockets layer (SSL) or Transport Layer Security (TLS) inspection), intrusion prevention, intrusion detection, denial of service attack (DoS) detection and mitigation, encryption (e.g., Internet Protocol Secure (IPsec), TLS, SSL), application control, Voice over Internet Protocol (VoIP) support, Virtual Private Networking (VPN), data leak prevention (DLP), antispam, antispyware, logging, reputa-tion-based protections, event correlation, network access control, vulnerability management, and the like. Such secu-rity functions may be deployed individually as part of a point solution or in various combinations in the form of a unified threat management (UTM) solution. Non-limiting examples of network security appliances/devices include network gateways, VPN appliances/gateways, UTM appliances (e.g., the FORTIGATE family of network security appliances), messaging security appliances (e.g., FORTIMAIL family of messaging security appliances), database security and/or compliance appliances (e.g., FORTIDB database security and compliance appliance), web application firewall appli-ances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability man-agement appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTI-WIFI family of wireless security gateways), and DoS attack detection appliances (e.g., the FORTIDDOS family of DoS attack detection and mitigation appliances).

Various embodiments provide methods for labeling a dataset that include: selecting, by a processing resource, an unlabeled data element from a set of unlabeled data elements to yield a selected, unlabeled data element, where non-selected unlabeled data elements in the set of unlabeled data elements are a non-selected set of unlabeled data elements; selecting, by the processing resource, a subset of the non-selected set of unlabeled data elements; merging, by the processing device, the selected, unlabeled data element with the subset of the non-selected set of unlabeled data elements to yield a merged, unlabeled dataset; forming, by the processing device, a union of the merged, unlabeled dataset and a labeled dataset to yield a union dataset; and calculating, by the processing resource, an expected performance value of the union dataset.

In some instances of the aforementioned embodiments, the set of unlabeled data elements is a set of unlabeled vectors, and wherein the labeled dataset is a set of labeled vectors. In some such instances, the methods further include generating the set of unlabeled vectors using a combination of at least a first heuristic and a second heuristic. In some cases, the first heuristic is selected as one of: a Shannon's entropy heuristic, a confidence based heuristic, a distance from decision hyperplane heuristic, an orthogonality to labeled points heuristic, an information density heuristic, a perturbation heuristic, an expected gradient length heuristic, and a consensus based heuristic; and the second heuristic is different from the first heuristic and selected as another of: the Shannon's entropy heuristic, the confidence based heuristic, the distance from decision hyperplane heuristic, the orthogonality to labeled points heuristic, the information density heuristic, the perturbation heuristic, the expected gradient length heuristic, and the consensus based heuristic. In one or more instances, the methods further include generating the set of unlabeled vectors using a combination of four or more of the following heuristics: a Shannon's entropy heuristic, a confidence based heuristic, a distance from decision hyperplane heuristic, an orthogonality to labeled points heuristic, an information density heuristic, a perturbation heuristic, an expected gradient length heuristic, and a consensus based heuristic.

In one or more instances of the aforementioned embodiments, the methods further include changing, by the processing resource, an order of unlabeled data elements in the non-selected set of unlabeled data elements prior to selecting the subset of the non-selected set of unlabeled data elements. In some instances of the aforementioned embodiments, selecting the subset of the non-selected set of unlabeled data elements is done using a step size variable indicating an offset into the non-selected set of unlabeled data elements. In various instances of the aforementioned embodiments where the subset of the non-selected set of unlabeled data elements is a first subset of the non-selected set of unlabeled data elements; the merged, unlabeled dataset is a first merged, unlabeled dataset; the union dataset is a first union dataset; the expected performance value is a first performance value; the methods further include: selecting, by the processing resource, a second subset of the non-selected set of unlabeled data elements; merging, by the processing device, the selected, unlabeled data element with the second subset of the non-selected set of unlabeled data elements to yield a second merged, unlabeled dataset; forming, by the processing device, a union of the second merged, unlabeled dataset and the labeled dataset to yield a second union dataset; and calculating a second expected performance value of the second union dataset. In some such instances, the methods further include: combining, by the processing resource, at least the first expected performance value with the second expected performance value to yield a composite performance value for the selected, unlabeled data element; and ranking, by the processing resource, the selected, unlabeled data element relative to at least one of the non-selected unlabeled data elements based at least in part on the composite performance value. In some cases combining at least the first expected performance value with the second expected performance value to yield the composite performance value for the selected, unlabeled data element is:

averaging, by the processing resource, at least the first expected performance value with the second expected performance value to yield the composite performance value.

In some instances of the aforementioned embodiments, where selected, unlabeled data element is a first selected, unlabeled data element; the non-selected set of unlabeled data elements is a first non-selected set of unlabeled data elements; the subset of the non-selected set of unlabeled data elements is a first subset of the non-selected set of unlabeled data elements; the merged, unlabeled dataset is a first merged, unlabeled dataset; wherein the union dataset is a first union dataset; wherein the expected performance value is a first performance value; and wherein the methods further include: selecting, by the processing resource, a second unlabeled data element from the set of unlabeled data elements to yield a second selected, unlabeled data element, wherein non-selected unlabeled data elements in the set of unlabeled data elements are a second non-selected set of unlabeled data elements; selecting, by the processing resource, a second subset of the non-selected set of unlabeled data elements; merging, by the processing device, the second selected, unlabeled data element with the second subset of the non-selected set of unlabeled data elements to yield a second merged, unlabeled dataset; forming, by the processing device, a second union of the second merged, unlabeled dataset and the labeled dataset to yield a second union dataset; and calculating a second expected performance value of the second union dataset. In some cases, the methods further include using at least the first expected performance value and the second expected performance value to rank the first selected, unlabeled data element relative to the second selected, unlabeled data element.

Other embodiments provide systems for labeling a dataset that include: a processing resource, and a non-transitory computer-readable medium coupled to the processing resource. The non-transitory computer-readable medium has stored therein instructions that when executed by the processing resource cause the processing resource to: select an unlabeled data element from a set of unlabeled data elements to yield a selected, unlabeled data element, wherein non-selected unlabeled data elements in the set of unlabeled data elements are a non-selected set of unlabeled data elements; select a subset of the non-selected set of unlabeled data elements; merge the selected, unlabeled data element with the subset of the non-selected set of unlabeled data elements to yield a merged, unlabeled dataset; form a union of the merged, unlabeled dataset and a labeled dataset to yield a union dataset; and calculate an expected performance value of the union dataset.

Yet other embodiments provide non-transitory computer-readable storage media embodying a set of instructions, which when executed by one or more processing resources of a computer system, causes the one or more processing resources to: select an unlabeled data element from a set of unlabeled data elements to yield a selected, unlabeled data element, where non-selected unlabeled data elements in the set of unlabeled data elements are a non-selected set of unlabeled data elements; selecting a subset of the non-selected set of unlabeled data elements; merge the selected, unlabeled data element with the subset of the non-selected set of unlabeled data elements to yield a merged, unlabeled dataset; form a union of the merged, unlabeled dataset and a labeled dataset to yield a union dataset; and calculate an expected performance value of the union dataset.

Additional embodiments provide methods for training a mathematical model using spatial emphasis. Such methods include: receiving, by a processing resource, a set of vectors to be ranked; applying, by the processing resource, a mathematical model to the set of vectors to be ranked to yield a set of predicted vectors; using, by the processing resource, a spatial emphasis value, the set of vectors to be ranked, and the set of predicted vectors in a scaling function to enhance a region of interest within a range expected for the set of vectors to yield a tuned scaling function; and training, by the processing resource, the mathematical model on the tuned scaling function.

In some instances of the aforementioned embodiments, the mathematical model is a neural network model. In various instances of the aforementioned embodiments, the scaling function is a function of: the spatial emphasis value; an expected label for each of the set of vectors to be ranked; and a label predicted by the vector ranking model for each of the set of vectors to be ranked. In some cases, the spatial emphasis value is one. In various cases, the scaling function is further a function of a weight decay tuning value. In some such cases, the methods further include determining, by the processing resource, the weight decay tuning value using Tree Parzen Estimation.

In various instances of the aforementioned embodiments the scaling function includes a combination of only exponent, square, and linear functions. In some instances of the aforementioned embodiments, the scaling function is an exponential loss function. In various instances of the aforementioned embodiments, the scaling function is:

$$\frac{1}{N}\sum_i \exp\left(-\frac{(y_i - region_{interest})^2}{2\tau^2}\right)(y_i - \hat{y}_i)^2$$

where $region_{interest}$ is the spatial emphasis value, $y_i$ is the label that the vector ranking model should have provided, $\hat{y}_i$ is the label predicted by the vector ranking model, N is the number of vectors in the set of vectors, i is a counter from 1 to N, and $\tau$ is a weight decay tuning value.

Additional embodiments provide systems for training a mathematical model using spatial emphasis. Such systems include: a processing resource and a non-transitory computer-readable medium coupled to the processing resource. The non-transitory computer-readable medium has stored therein instructions that when executed by the processing resource cause the processing resource to: receive a set of vectors to be ranked; apply a mathematical model to the set of vectors to be ranked to yield a set of predicted vectors; use a spatial emphasis value, the set of vectors to be ranked, and the set of predicted vectors in a scaling function to enhance a region of interest within a range expected for the set of vectors to yield a tuned scaling function; and train the mathematical model on the tuned scaling function.

Further embodiments provide non-transitory computer-readable storage media embodying a set of instructions, which when executed by one or more processing resources of a computer system, causes the one or more processing resources to: receive a set of vectors to be ranked; apply a mathematical model to the set of vectors to be ranked to yield a set of predicted vectors; use a spatial emphasis value, the set of vectors to be ranked, and the set of predicted vectors in a scaling function to enhance a region of interest within a range expected for the set of vectors to yield a tuned scaling function; and train the mathematical model on the tuned scaling function.

Yet further embodiments provide methods for automated handling of data and conceptual drift. Such methods include: receiving, by a processing resource, at least a first decision output and a first confidence value corresponding to the first decision output and a second decision output and a second confidence value corresponding to the second decision output, wherein the first decision output and the second decision output are included in a set of decision outputs from a first mathematical model; selecting, by the programming resource, the first decision output for inclusion in a subset of the set of decision outputs based upon the first confidence value exceeding a confidence threshold value; applying, by the processing resource, a second mathematical model to a dataset including the subset of the set of decision outputs, wherein the second mathematical model provides an updated decision output corresponding to the first decision output; and selecting, by the processing resource, the first decision output for labelling based at least in part on a combination of the first decision output and the updated decision output.

In some instances of the aforementioned embodiments, the dataset including the subset of the set of decision outputs further includes a plurality of previously labelled decision outputs. In some such instances, the methods further include: labelling, by the processing resource, the first decision output to yield a newly labelled decision output; and adding, by the processing resource, the newly labelled decision output to the plurality of previously labelled decision outputs.

In some instances of the aforementioned embodiments, the method further include comparing, by the processing resource, the first decision output with one of the previously labelled decision outputs to yield a comparison result. In such instances selecting the first decision output for labelling is done based at least in part on the combination of the first decision output and the updated decision output, and upon the comparison result. In some such instances, the comparison result indicates that the one of the previously labelled decision outputs is similar to the first decision output.

In various instances of the aforementioned embodiments, the methods further include excluding, by the processing resource, the second decision output from inclusion in the subset of the set of decision outputs based upon the second confidence value being less than the confidence threshold value. In one or more instances of the aforementioned embodiments, selecting the first decision output for labelling based at least in part on the combination of the first decision output and the updated decision output includes selecting the first decision output for labelling based at least in part on the first decision output matching the updated decision output.

In some instances of the aforementioned embodiments, the second mathematical model is a neural network model. In various instances of the aforementioned embodiments, the methods further include automatically updating, by the processing resource, a pre-trained model to protect against temporal shifts in data, wherein the longevity of the pre-trained model is increased.

Other embodiments provide systems for automated handling of data and conceptual drift that include a processing resource, and a non-transitory computer-readable medium coupled to the processing resource. The non-transitory computer-readable medium has stored therein instructions that when executed by the processing resource cause the processing resource to: receive at least a first decision output and a first confidence value corresponding to the first decision output and a second decision output and a second confidence value corresponding to the second decision output, wherein the first decision output and the second decision output are included in a set of decision outputs from a first mathematical model; select the first decision output for inclusion in a subset of the set of decision outputs based upon the first confidence value exceeding a confidence threshold value; apply a second mathematical model to a dataset including the subset of the set of decision outputs, wherein the second mathematical model provides an updated decision output corresponding to the first decision output; and select the first decision output for labelling based at least in part on a combination of the first decision output and the updated decision output. In various instances of the aforementioned embodiments, the instructions that when executed by the processing resource further cause the processing resource to automatically update a pre-trained model to protect against temporal shifts in data, wherein the longevity of the pre-trained model is increased.

Further embodiments provide non-transitory computer-readable storage media embodying a set of instructions, which when executed by one or more processing resources of a computer system, causes the one or more processing resources to: receive at least a first decision output and a first confidence value corresponding to the first decision output and a second decision output and a second confidence value corresponding to the second decision output, wherein the first decision output and the second decision output are included in a set of decision outputs from a first mathematical model; select the first decision output for inclusion in a subset of the set of decision outputs based upon the first confidence value exceeding a confidence threshold value; apply a second mathematical model to a dataset including the subset of the set of decision outputs, wherein the second mathematical model provides an updated decision output corresponding to the first decision output; and select the first decision output for labelling based at least in part on a combination of the first decision output and the updated decision output.

Yet further embodiments provide methods for identifying a high value labeling target that include: receiving, by a processing resource, a first set of data elements including at least a first data element and a second data element; applying, by the processing resource, a mathematical model to the first set of data elements to yield at least: a first predicted output corresponding to the first data element, and a second predicted output corresponding to the second data element; adding, by the processing resource, a perturbation to the first data element to yield a perturbed data element; applying, by the processing resource, the mathematical model to a second set of data elements including the perturbed data element to yield at least a third predicted output corresponding to the perturbed data element; and using, by the processing resource, a combination of the first predicted output and the third predicted output to determine a labeling value of the first data element. In some instances of the aforementioned embodiments, the first data element is a first vector, wherein the second data element is a second vector, and wherein the set of data elements is a set of vectors.

In various instances of the aforementioned embodiments, using the combination of the first predicted output and the third predicted output to determine the labeling value of the first data element includes: calculating, by the processing resource, divergence of the first predicted output to yield a first divergence; calculating, by the processing resource, divergence of the third predicted output to yield a second divergence; and using, by the processing resource, a combination of the first divergence and the second divergence to determine a labeling value of the first data element. In some cases, both the first divergence and the second divergence are calculated using a Kullback-Leibler algorithm in accordance with the following equation:

$$D_{KL}(p(y|x)\|p(y|x+\epsilon)).$$

In various cases, using the combination of the first divergence and the second divergence to determine a labeling value of the first data element includes: calculating, by the processing resource, a difference between the first divergence and the second divergence to yield a divergence difference; and comparing, by the processing resource, the divergence difference to a threshold value, where upon determining that the divergence difference exceeds the threshold value, the first data element is identified as a high value labeling target.

In some instances of the aforementioned embodiments where the perturbed data element is a first perturbed data element, the methods further include: calculating, by the processing resource, divergence of the second predicted output to yield a third divergence; adding, by the processing resource, the perturbation to the second data element to yield a second perturbed data element, wherein the second set of data elements includes the second perturbed data element, and wherein applying the mathematical model to the second set of data elements further yields: a fourth predicted output corresponding to the second perturbed data element; calculating, by the processing resource, divergence of the fourth predicted output to yield a fourth divergence; and using, by the processing resource, a combination of the third divergence and the fourth divergence to determine a labeling value of the second data element.

In various instances of the aforementioned embodiments where the first predicted output is a first class, and the third predicted output is a second class, using the combination of the first predicted output and the third predicted output to determine labeling value of the first data element includes: identifying, by the processing resource, the first data element as a high value labeling target where the first class is different from the second class. In other instances of the aforementioned embodiments where the first predicted output is a first class, and the third predicted output is a second class, using the combination of the first predicted output and the second predicted output to determine labeling value of the first data element includes: identifying, by the processing resource, the first data element as a low value labeling target where the first class is the same as the second class.

In some instances of the aforementioned embodiments, the methods further include using, by the processing resource, the labeling value of the first vector along with the result of at least one other heuristic to rank the first vector relative to the second vector. In some such instances the at least one other heuristic is one of: a Shannon's entropy heuristic, a confidence based heuristic, an orthogonality to labeled points heuristic, a distance from decision hyperplane heuristic, an information density heuristic, an expected gradient length heuristic, or a consensus based heuristic.

Additional embodiments provide systems for identifying a high value labeling target that include: a processing resource and a non-transitory computer-readable medium coupled to the processing resource. The non-transitory computer readable medium has stored therein instructions that when executed by the processing resource cause the processing resource to: receive a first set of data elements including at least a first data element and a second data element; apply a mathematical model to the first set of data elements to yield at least: a first predicted output corresponding to the first data element, and a second predicted output corresponding to the second data element; add a perturbation to the first data element to yield a perturbed data element; apply the mathematical model to a second set of data elements including the perturbed data element to yield at least a third predicted output corresponding to the perturbed data element; and use a combination of the first predicted output and the third predicted output to determine a labeling value of the first data element.

Yet further embodiments provide methods for identifying an ignored labeling target. Such methods include: receiving, by a processing resource, a set of vectors including at least an unlabeled vector, a first labeled vector, and a second labeled vector; calculating, by the processing resource, a first angle between the unlabeled vector and the first labeled vector, and a second angle between the unlabeled vector and the second labeled vector; and using, by the processing resource, a combination of the first angle and the second angle to determine a labeling value of the unlabeled vector.

In some instances of the aforementioned embodiments, using the combination of the first angle and the second angle to determine a labeling value of the unlabeled vector includes: determining, by the processing resource, that the first angle is less than the second angle; and identifying, by the processing resource, the first angle as a minimum angle based at least in part on determining that the first angle is less than the second angle. In some such instances, using the combination of the first angle and the second angle to determine a labeling value of the unlabeled vector further includes comparing, by the processing resource, the minimum angle with a threshold value. In various cases, using the combination of the first angle and the second angle to determine a labeling value of the unlabeled vector further includes identifying, by the processing resource, the unlabeled vector as a high value labeling target where the minimum angle exceeds the threshold value. In some cases, the threshold value is user programmable.

In various instances of the aforementioned embodiments, the methods further include using, by the processing resource, the labeling value of the unlabeled vector along with the result of at least one other heuristic to rank the unlabeled vector relative to other unlabeled vectors. In some such instances, the at least one other heuristic is one of: a Shannon's entropy heuristic, a confidence based heuristic, a distance from decision hyperplane heuristic, an information density heuristic, a perturbation heuristic, an expected gradient length heuristic, or a consensus based heuristic.

Additional embodiments provide systems for identifying an ignored labeling target that include a processing resource, and a non-transitory computer-readable medium coupled to the processing resource. The non-transitory computer readable medium has stored therein instructions that when executed by the processing resource cause the processing resource to: receive a set of vectors including at least an unlabeled vector, a first labeled vector, and a second labeled vector; calculate a first angle between the unlabeled vector and the first labeled vector, and a second angle between the unlabeled vector and the second labeled vector; and use a combination of the first angle and the second angle to determine a labeling value of the unlabeled vector.

Yet additional embodiments provide non-transitory computer-readable storage media embodying a set of instructions, which when executed by one or more processing resources of a computer system, causes the one or more processing resources to: receive a set of vectors including at least an unlabeled vector, a first labeled vector, and a second labeled vector; calculate a first angle between the unlabeled vector and the first labeled vector, and a second angle between the unlabeled vector and the second labeled vector; and use a combination of the first angle and the second angle to determine a labeling value of the unlabeled vector.

Some embodiments provide methods for modeling data that include: ranking, by a processing resource, a set of unlabeled data elements based upon an expected impact of each of the unlabeled data elements on operation of a first mathematical model to yield a subset of high ranked data elements, where the subset of high ranked data elements includes at least one unlabeled data element having a ranking that is higher than another data element of the set of data elements not included in the subset of high ranked data elements; training, by the processing resource, the first mathematical model using a first dataset including both the subset of high ranked data elements and a set of previously labelled data elements to yield at least a first decision output and a first confidence value corresponding to the first decision output and a second decision output and a second confidence value corresponding to the second decision output; applying, by the processing resource, a second mathematical model to a second dataset including at least the first decision output, wherein the second mathematical model provides an updated decision output corresponding to the first decision output; and selecting, by the processing resource, the first decision output for labelling based at least in part on a combination of the first decision output and the updated decision output.

In some instances of the aforementioned embodiments, the methods further include: selecting, by the processing resource, the first decision output for inclusion in the second dataset based upon the first confidence value exceeding a confidence threshold value; and excluding, by the processing resource, the second decision output from inclusion in the second dataset based upon the second confidence value being less than the confidence threshold value. In various instances of the aforementioned embodiments, the methods further include comparing, by the processing resource, the first decision output with one of the previously labelled decision outputs to yield a comparison result. In such instances, selecting the first decision output for labelling is done based at least in part on the combination of the first decision output and the updated decision output, and upon the comparison result. In some cases, the comparison result indicates that the one of the previously labelled decision outputs is similar to the first decision output.

In various instances of the aforementioned embodiments, selecting the first decision output for labelling based at least in part on the combination of the first decision output and the updated decision output includes selecting, by the processing resource, the first decision output for labelling based at least in part on the first decision output matching the updated decision output. In some instances of the aforementioned embodiments ranking the set of unlabeled data elements based upon the expected impact of each of the unlabeled data elements on operation of the first mathematical model includes: selecting, by the processing resource, an unlabeled data element from a set of unlabeled data elements to yield a selected, unlabeled data element, wherein non-selected unlabeled data elements in the set of unlabeled data elements are a non-selected set of unlabeled data elements; selecting, by the processing resource, a subset of the non-selected set of unlabeled data elements; merging, by the processing device, the selected, unlabeled data element with the subset of the non-selected set of unlabeled data elements to yield a merged, unlabeled dataset; forming, by the processing device, a union of the merged, unlabeled dataset and a labelled dataset to yield a union dataset; and calculating, by the processing resource, an expected performance value of the union dataset. In some such instances where the set of unlabeled data elements is a set of unlabeled vectors, and the labelled dataset is a set of labelled vectors, the methods further include: generating the set of unlabeled vectors using a combination of at least a first heuristic and a second heuristic.

Turning to FIG. 1A, an example system 100 including a machine learning model training system 110 in accordance with some embodiments. Machine learning model training system 110 includes a seed vector identification module 132, a multiple process feature calculation module 134, a vector ranking module 136, a model selecting module 138, a model training module 140, and a labeling module 142.

Seed vector identification module 132 is configured to identify initial vectors for labeling. The process of identifying the seed vectors is provided below in relation to FIGS. 3A-3E. The resulting identified seed vectors are representative of a particular class for which they are labeled to yield a set of labeled vectors. Some embodiments discussed herein apply pre-clustering techniques to determine an initial set of labeled vectors.

Multiple process feature calculation module 134 is configured to determine multiple heuristics that are in turn provided to a ranking model and used in relation to vector ranking. In particular, a number of heuristics are calculated for each decision output vector provided from the model to be trained. Such heuristics may include, but are not limited to, Shannon's entropy heuristic, a confidence based heuristic, a distance from decision hyperplane heuristic, an orthogonality to labeled points heuristic, an information density heuristic, a perturbation heuristic, an expected gradient length heuristic, and/or a consensus based heuristic. These heuristics are computed for each unlabeled vector using information gleaned from the labeled vectors and the problem space as a whole. In order to ensure our analysis will detect insightful vectors critical for labeling rather than vectors our target simply fails to classify properly, we train multiple models in addition to the model to be trained in an effort to aid in the heuristic compilation process. Based upon the disclosure provided herein, one of ordinary skill in the art will recognize other heuristics that may be used in relation to different embodiments.

Vector ranking module 136 is configured to rank vectors based at least in part on the aforementioned set of heuristics. In some embodiments, vector ranking module 136 is a Vector Querying Neural Network (VQNN) where the heuristics are used to rank the unlabeled vectors as to which is most important to proper operation of the model to be trained. In effect, by feeding the heuristics to such a neural network each strategy represented by the respective heuristics are represented in the process of determining a desired vector to label next. Use of such a combination of heuristics avoids common pitfalls that plague single heuristic strategies such as selecting outliers to label rather than vectors that can greatly improve model accuracy.

An exponential loss function as shown in the following equation is applied to the ranked vectors to enhance the fineness of the ranking of vectors around the previously identified region of interest (i.e., yi values falling in the region of interest):

$$\frac{1}{N}\sum_i \exp\left(-\frac{(y_i - region_{interest})^2}{2\tau^2}\right)(y_i - \hat{y}_i)^2$$

where $y_i$ is the ranking that should have happened, $\hat{y}_i$ (hereinafter also denoted yihat) is the ranking predicted by the neural network model, N is the number of vectors considered, and τ is a hyper parameter that controls how quickly weight falloff occurs. One of ordinary skill in the art will appreciate that a correct value of τ can be determined in a variety of different ways including, but not limited to, an automated approach using Tree Parsen Estimation. In some embodiments, the $region_{interest}$ is hand selected by one knowledgeable problem set. In other embodiments, an estimated optimum value can be identified by hyperparameter tuning in a similar manner as τ. In some cases of vector ranking discussed herein, the VQNN may be trained using a $region_{interest}$ equal to 1.

Model to be trained training module 138 is configured to accept a number of unlabeled and labeled vectors that are used to train a model to be trained, and to determine whether the quality of the output of the model to be trained is sufficient. In some embodiments, the output of the model to be trained includes a series of decision output vectors and corresponding confidence outputs that each indicate a level of confidence for a respective one of the series of decision output vectors. Any approach and/or thresholds known in the art for determining model accuracy may be used. For example, in some embodiments, the model to be trained is considered sufficiently accurate where more than ninety-five (95) percent of the decision output vectors match the label applied to the corresponding input vectors. Based upon the disclosure provided herein, one of ordinary skill in the art will recognize a variety of thresholds and/or approaches for determining that the model to be trained is sufficiently accurate.

Oracle input module 140 is configured to receive input indicating a status of a vector that has been selected for labeling. The selected, unlabeled vectors are selected based upon which have the highest rank. By ranking vectors based upon their expected value to the model to be trained and providing only the highest ranked to the oracle for labeling, time and effort of the oracle to perform the labeling process is dramatically decreased.

Labeling module 142 is configured to perform automated, adaptive labeling to vectors that exhibit a high degree of confidence indicated, for example, by exceeding a programmable user threshold of confidence. Labeling module 142 processes such high confidence vectors through a mathematical model that validates the decision output. Finally, labeling module 142 compares any vectors where the decision output was validated to previously labeled vectors having the same label as indicated by the decision output vector. Where a previously labeled vector is found that is similar to the unlabeled vector under consideration and the labels for both would be the same, labeling module 142 labels the unlabeled vector is labeled with the label indicated by the decision output vector and it is added to the labeled vector set.

Figure 1B:
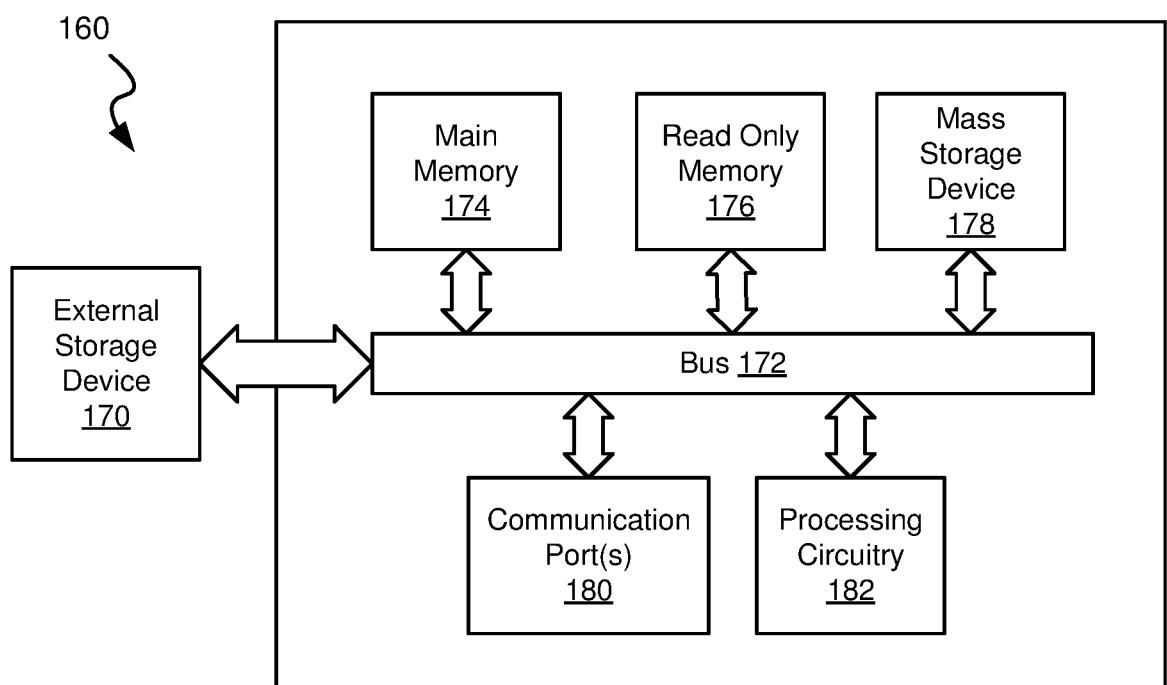

Turning to FIG. 1B, an example computer system 160 in which or with which embodiments of the present disclosure may be utilized is shown. As shown in FIG. 1CB computer system 160 includes an external storage device 170, a bus 172, a main memory 174, a read-only memory 176, a mass storage device 178, one or more communication ports 180, and one or more processing resources (e.g., processing circuitry 182). In one embodiment, computer system 160 may be used to perform the functions discussed herein in relation to FIGS. 1A and 2-6. Those skilled in the art will appreciate that computer system 160 may include more than one processing resource and communication port 180. Non-limiting examples of processing circuitry 182 include, but are not limited to: Intel Quad-Core, Intel i3, Intel i5, Intel i7, Apple M1, AMD Ryzen, or AMD® Opteron® or Athlon MP® processor(s), Motorola® lines of processors, Forti-SOC™ system on chip processors or other future processors. Processor 1070 may include various modules associated with embodiments of the present disclosure.

Communication port 180 can be any of an RS-232 port for use with a modem-based dialup connection, a 10/100 Ethernet port, a Gigabit, 10 Gigabit, 25G, 40G, and 100G port using copper or fiber, a serial port, a parallel port, or other existing or future ports. Communication port 180 may be chosen depending on a network, such as a Local Area Network (LAN), Wide Area Network (WAN), or any network to which the computer system connects.

Memory 174 can be Random Access Memory (RAM), or any other dynamic storage device commonly known in the art. Read only memory 176 can be any static storage device(s) e.g., but not limited to, a Programmable Read Only Memory (PROM) chips for storing static information e.g. start-up or BIOS instructions for the processing resource.

Mass storage device 178 may be any current or future mass storage solution, which can be used to store information and/or instructions. Non-limiting examples of mass storage solutions include Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K144), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 172 communicatively couples processing resource(s) with the other memory, storage and communication blocks. Bus 172 can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processing resources to software system.

Optionally, operator and administrative interfaces, e.g., a display, keyboard, and a cursor control device, may also be coupled to bus 172 to support direct operator interaction with computer system. Other operator and administrative interfaces can be provided through network connections connected through communication port 180. External storage device 170 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure.

While embodiments of the present disclosure have been illustrated and described, numerous modifications, changes, variations, substitutions, and equivalents will be apparent to those skilled in the art. Thus, it will be appreciated by those of ordinary skill in the art that the diagrams, schematics, illustrations, and the like represent conceptual views or processes illustrating systems and methods embodying various non-limiting examples of embodiments of the present disclosure. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing the particular embodiment. Those of ordinary skill in the art further understand that the exemplary hardware, software, processes, methods, and/or operating systems described herein are for illustrative purposes and, thus, are not intended to be limited to any particular named. While the foregoing describes various embodiments of the disclosure, other and further embodiments may be devised without departing from the basic scope thereof.

Turning to FIG. 2, a flow diagram shows a method in accordance with various embodiments for model development. Following flow diagram 200, a problem space is selected for modeling (block 202). Such a problem space may be any problem space where data is available for training a model to be trained. Based upon the disclosure provided herein, one of ordinary skill in the art will recognize a large variety of problem spaces to which embodiments discussed herein may be applied. Data relevant to the problem space is obtained (block 203). Any approach known in the art may be used for obtaining data for a problem space. For example, where the problem space is identifying malicious emails, large numbers of emails may be collected into a database to be used for training the model to be trained.

The type of model to be trained is selected (block 204). As is known in the art, some model types are more useful for certain types of problem spaces than other models. Such model types may include, but are not limited to, various classes of neural network models or linear regression models. Based upon the disclosure provided herein, one of ordinary skill in the art will recognize a variety of model types that may be selected as a model to be trained in accordance with different embodiments.

Along with identifying a type of model to be trained (block 204), a user can also select a region of interest for the problem space (block 206). The region of interest is a region of the dataset where for a reason the user wants to place particular focus. As one of many examples, assume the problem space involves identifying malicious emails. In this problem space clearly malicious emails may be given a value of one thousand (1000) and clearly benign emails may be given a value of zero (0) with all values in between representing a likelihood that a particular email is malicious. For operational purposes, all emails with a value greater than five hundred are considered malicious and all other emails are considered benign. As emails with values greater than six hundred (600) exhibit a significant degree of confidence that the email is malicious and all emails with a value less than four hundred (400) exhibit a significant degree of confidence that the email is benign, careful classification of such emails is not necessary as an error still likely results in proper classification. However, for emails with values in the range of four hundred (400) to six hundred (600) an error made as part of the classification process could incorrectly label a benign email as malicious or a malicious email as benign. Thus, in this case, the region of interest would be from four hundred (400) to six hundred (600) where a heightened degree of consideration is desired. This region of interest comes into play when considering the ranking of vectors to be presented to an oracle for labeling as more fully discussed below.

Seed vectors within the obtained data are identified and labeled (block 208). This block is shown in dashed lines as a more detailed discussion of one embodiment of seed vector identification is provided below in relation to FIGS. 3A-3E, and the identified seed vectors are representative of a particular class for which they are labeled to yield a set of labeled vectors. Some embodiments discussed herein apply pre-clustering techniques to determine an initial set of labeled vectors. Such pre-clustering is applied to high dimensional, multi-class problem spaces as shown in FIGS. 3A-3E.

The resulting set of labeled vectors along with other unlabeled vectors from the problem space are used to train the model to be trained (block 210). As is known in the art, training a mathematical model includes providing real life data, some of which has been labeled, and adaptively changing the model until resulting outputs provided from the model reflect the labeled data. In embodiments herein, such model training is used not only to train the model to be trained, but also to identify portions of the data in the problem space that would be highly valuable to the model operation if it was properly labeled.

To the end of identifying portions of the data in the problem space that would be highly valuable to the model operation if it was properly labeled, the outputs from the model to be trained (i.e., a series of decision output vectors and corresponding confidence outputs indicating a level of confidence for each of the series of decision output vectors) are used to: perform multiple process feature calculation, rank the vectors, and to select a subset of the highest ranked vectors (block 212). This block is shown in dashed lines as a more detailed discussion of one embodiment of seed vector identification is provided below in relation to FIGS. 4-6. In the process, a number of heuristics are calculated for each decision output vector provided from the model to be trained. Such heuristics may include, but are not limited to, Shannon's entropy heuristic, a confidence based heuristic, a distance from decision hyperplane heuristic, an orthogonality to labeled points heuristic, an information density heuristic, a perturbation heuristic, an expected gradient length heuristic, and/or a consensus based heuristic. These heuristics are computed for each unlabeled vector using information gleaned from the labeled vectors and the problem space as a whole. In order to ensure our analysis will detect insightful vectors critical for labeling rather than vectors our target simply fails to classify properly, we train multiple models in addition to the model to be trained in an effort to aid in the heuristic compilation process. Based upon the disclosure provided herein, one of ordinary skill in the art will recognize other heuristics that may be used in relation to different embodiments.

The resulting set of heuristics are provided as a feature set that is fed into a VQNN where the heuristics are used to rank the unlabeled vectors as to which is most important to proper operation of the model to be trained. In effect, by feeding the heuristics to such a neural network each strategy represented by the respective heuristics are represented in the process of determining a desired vector to label next. Use of such a combination of heuristics avoids common pitfalls that plague single heuristic strategies such as selecting outliers to label rather than vectors that can greatly improve model accuracy.

An exponential loss function as shown in the following equation is applied to the ranked vectors to enhance the fineness of the ranking of vectors around the previously identified region of interest (i.e., yi values falling in the region of interest):

$$\frac{1}{N}\sum_i \exp\left(-\frac{(y_i - region_{interest})^2}{2\tau^2}\right)(y_i - \hat{y}_i)^2$$

where $y_i$ is the ranking that should have happened, $\hat{y}_i$ (hereinafter also denoted yihat) is the ranking predicted by the neural network model, N is the number of vectors considered, and $\tau$ is a hyper parameter that controls how quickly weight falloff occurs. One of ordinary skill in the art will appreciate that a correct value of $\tau$ can be determined in a variety of different ways including, but not limited to, an automated approach using Tree Parsen Estimation. In some embodiments, the $region_{interest}$ is hand selected by one knowledgeable problem set. In other embodiments, an estimated optimum value can be identified by hyperparameter tuning in a similar manner as $\tau$. In some cases of vector ranking discussed herein, the VQNN may be trained using a $region_{interest}$ equal to 1.

A small percentage of the unlabeled vectors are selected to be passed to an oracle for labeling (block 214). The selected, unlabeled vectors are selected based upon which have the highest rank. In turn, the oracle applies labels to these previously unlabeled vectors and incorporates the labels into the labeled vector set. In some cases, the oracle is a human with knowledge of the problem space. However, in other cases, the label may be another non-human source of information about the problem space. Based upon the disclosure provided herein, one of ordinary skill in the art will recognize a variety of oracles that may be used in relation to different embodiments. By ranking vectors based upon their expected value to the model to be trained and providing only the highest ranked to the oracle for labeling, time and effort of the oracle to perform the labeling process is dramatically decreased.

The augmented set of labeled vectors along with other unlabeled vectors from the problem space are used to again train the model to be trained (block 216). Again, the output of the model to be trained includes a series of decision output vectors and corresponding confidence outputs that each indicate a level of confidence for a respective one of the series of decision output vectors. It is determined whether the model to be trained has achieved sufficient accuracy such that it can be deployed to handle wild unlabeled data (block 218). Any approach and/or thresholds known in the art for determining model accuracy may be used. For example, in some embodiments, the model to be trained is considered sufficiently accurate where more than ninety-five (95) percent of the decision output vectors match the label applied to the corresponding input vectors. Based upon the disclosure provided herein, one of ordinary skill in the art will recognize a variety of thresholds and/or approaches for determining that the model to be trained is sufficiently accurate. Where the model to be trained is sufficiently accurate (block 218), the training process ends and the model is deployed (block 222).

Figure 8:
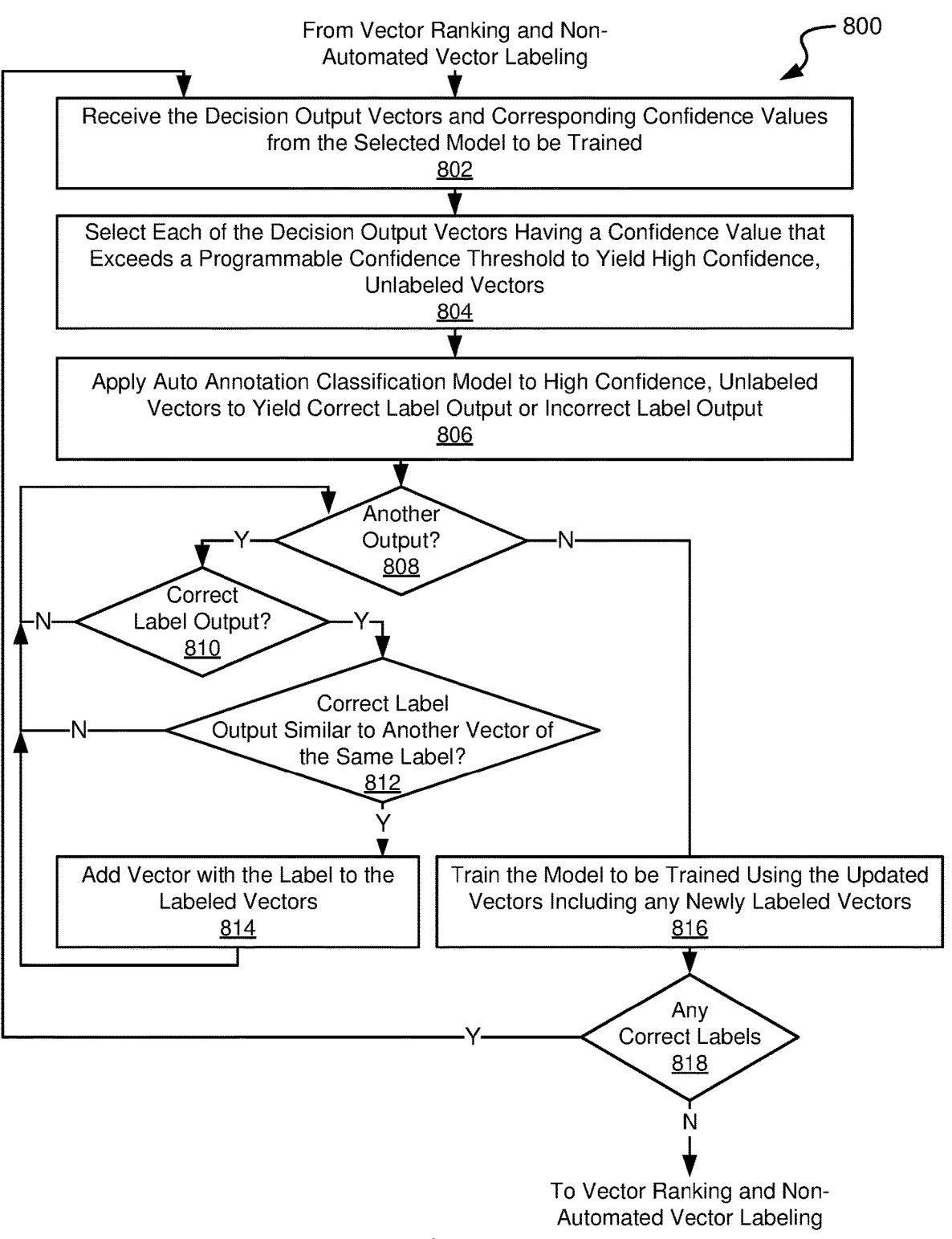
FIG. 8 is a flow diagram showing a method for adaptive vector labeling in accordance with various embodiments.

Alternatively, where the model to be trained is not sufficiently accurate (block 218), the series of decision output vectors and corresponding confidence outputs from the model to be trained are used to perform automated, adaptive labeling (block 220). This block is shown in dashed lines as a more detailed discussion of one embodiment of automated, adaptive labeling is provided below in relation to FIG. 8. Such automated, adaptive labeling applies labels to only those vectors exhibiting the highest degree of confidence. Thus, only decision output vectors from the model to be trained that have a corresponding confidence value that exceeds a programmable user threshold are considered for labeling. Next, the high confidence vectors are processed through a mathematical model that validates the decision output. Finally, the vectors where the decision output was validated are compared to previously labeled vectors having the same label as indicated by the decision output vector. Where a previously labeled vector is found that is similar to the unlabeled vector under consideration and the labels for both would be the same, the unlabeled vector is labeled with the label indicated by the decision output vector and it is added to the labeled vector set. The model to be trained is re-trained using the newly augmented labeled vector set and the process of automated, adaptive labeling is repeated until no decision output vectors exhibit a confidence value that exceeds the programmable user threshold. Once no decision output vectors exhibit a confidence value that exceeds the programmable user threshold, the process returns to block 212.

Seed Vector Identification

Turning to FIGS. 3A-3E an automated process for identifying seed vectors is graphically depicted. In order to start querying vectors, we need an initial set of data with which we can train a preliminary model. Obtaining such data was discussed above in relation to block 204 of FIG. 2, and the automated process for identifying seed vectors discussed in relation to FIGS. 3A-3E may be used in some embodiments in place of block 208 discussed above in relation to FIG. 2.

While traditional active learning algorithms create a set of seed vectors using randomly sampled data, some embodiments discussed herein utilize pre-clustering sampling techniques to determine an initial set of labeled vectors (i.e., seed vectors). Such an approach can lead to improvements in final model performance. However, use of pre-clustering techniques have only been shown to work in low dimensional, binary classification tasks. In contrast, some embodiments discussed herein are modified to allow application of pre-clustering techniques to determine seed vectors in high-dimensional multi-class problem spaces. As used herein, the phrase "high-dimensional data" is used in its broadest sense to mean a dataset having a number of dimensions that is so high that the number of features can exceed the number of observations. Based upon the disclosure provided herein, one of ordinary skill in the art will recognize a variety of high dimensional data to which embodiments discussed herein may be applied. It is also noted that embodiments are not limited to application to high dimensional data, but may be applied to datasets that are not high dimensional.

Figure 3A:
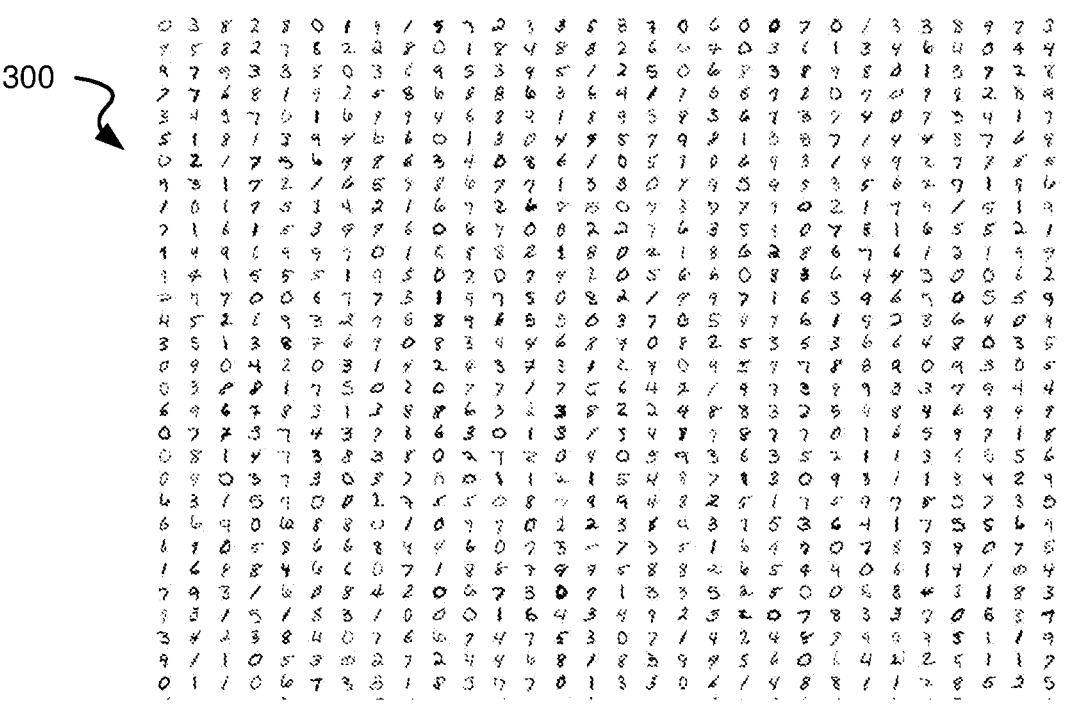
FIGS. 3A-3E show an example of processing high dimensional data that may be used in relation to some embodiments.

Turning specifically to FIG. 3A, a set of high dimensional data 300 is provided. Again, while the process is described in relation to a high-dimensional dataset, the process may also be applied to non-high dimensional datasets. High-dimensional data 300 includes three instances of a hand-drawn number "1". High-dimensional data 300 is clustered using Gaussian Mixture Modeling (GMM), using cluster medoids as seeds s is known in the art. The optimal clustering, assessed by both number of clusters and distribution of points within clusters, is determined using the average silhouette approach as is known in the art. Such clustering techniques have performance issues when utilized in high-dimensional datasets due to, for example, higher data sparsity and increased irrelevance of notions of distance.

Figure 3B:
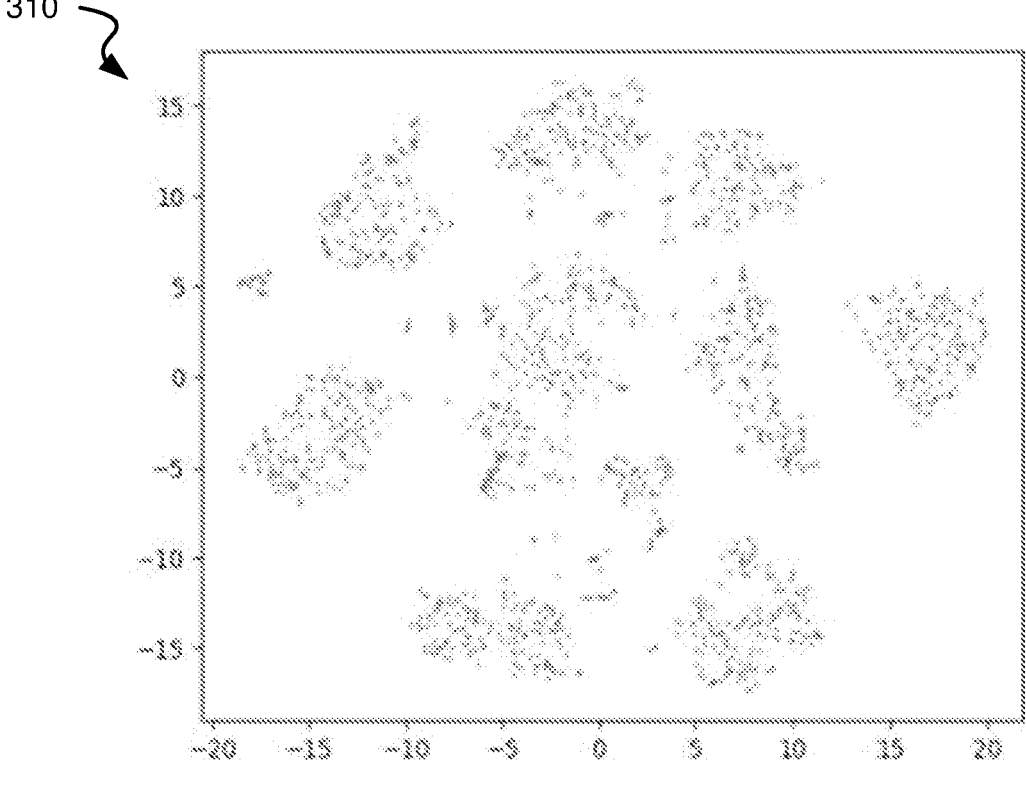
Figure 3C:
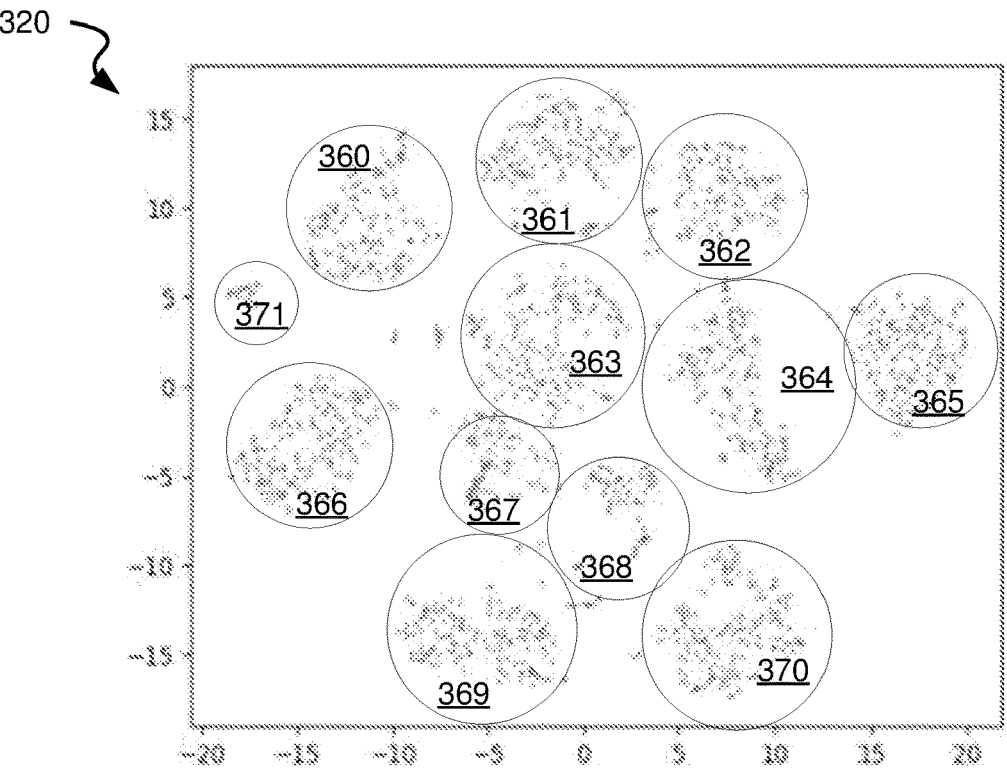
Figure 3D:
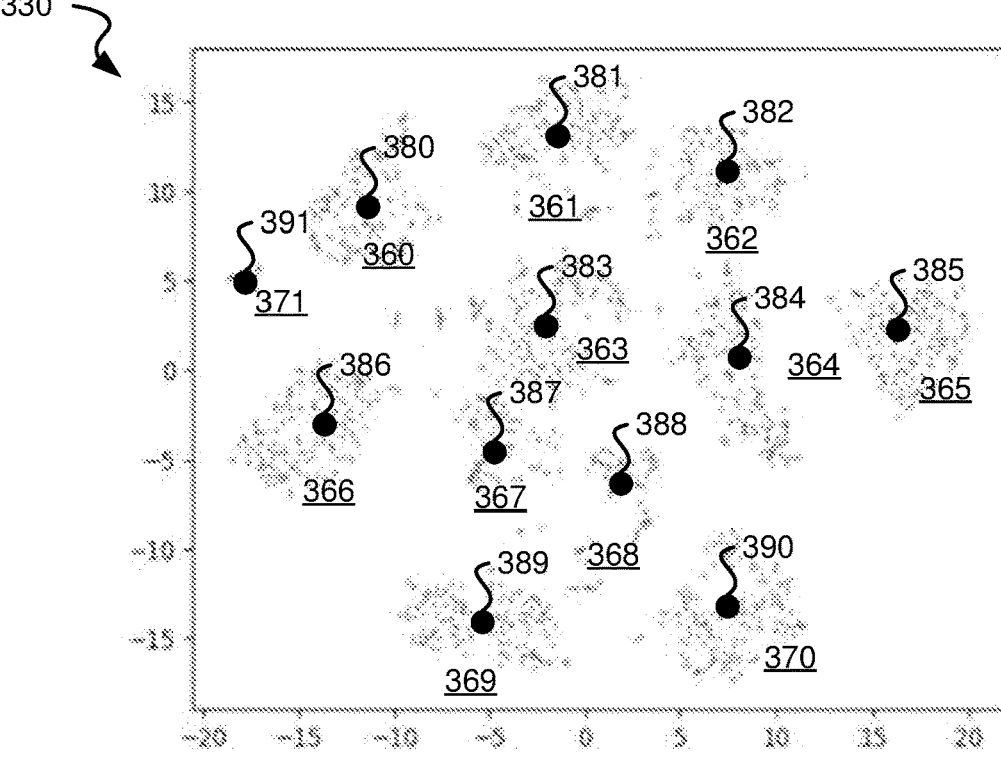
Figure 3E:
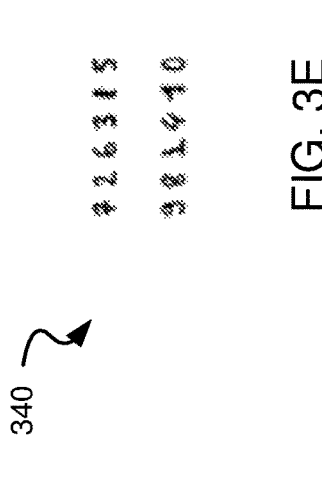

Some embodiments resolve the data sparsity and increased irrelevance by applying a manifold learning technique t-Distributed Stochastic Neighbor Embedding (t-SNE) for dimensionality reduction prior to applying the aforementioned clustering. An example of application of t-SNE to high dimensional data 300 is shown in FIG. 3B as a t-SNE reduced dataset 310 having a lower dimensional representation than high dimensional data 300. As shown in the example, application of t-SNE substantially reduces the dimensional representation of the input dataset. After application of the t-SNE, the aforementioned GMM is applied to cluster a t-SNE reduced dataset 310 to yield the clustered dataset 320 of FIG. 3C. In particular, clusters of data 360, 361, 362, 363, 364, 365, 366, 367, 368, 369, 370 (outlined with circles) are found. Then, as shown in FIG. 3D, a medoid for each of the respective clusters of data 360, 361, 362, 363, 364, 365, 366, 367, 368, 369, 370 is calculated (i.e., medoids 380, 381, 382, 383, 384, 385, 386, 387, 388, 389, 390). Each of the medoids (in this example, twelve medoids) are then provided in their original data format as shown as seed vectors 340 of FIG. 3E. In this example, the process provides seed vectors 340 that can be used to identify all three of the hand-drawn instances of the number "1" found in high-dimensional data 300. Further understanding of the above-described seed vector identification approach is set forth in U.S. patent application Ser. No. 17/018,930 entitled "CONVEX OPTIMIZED STOCHASTIC VECTOR SAMPLING BASED REPRESENTATION OF GROUND TRUTH", and filed by Khanna on Sep. 11, 2020. The entirety of the aforementioned reference is incorporated herein by reference for all purposes.

Vector Ranking Features

Figure 4:
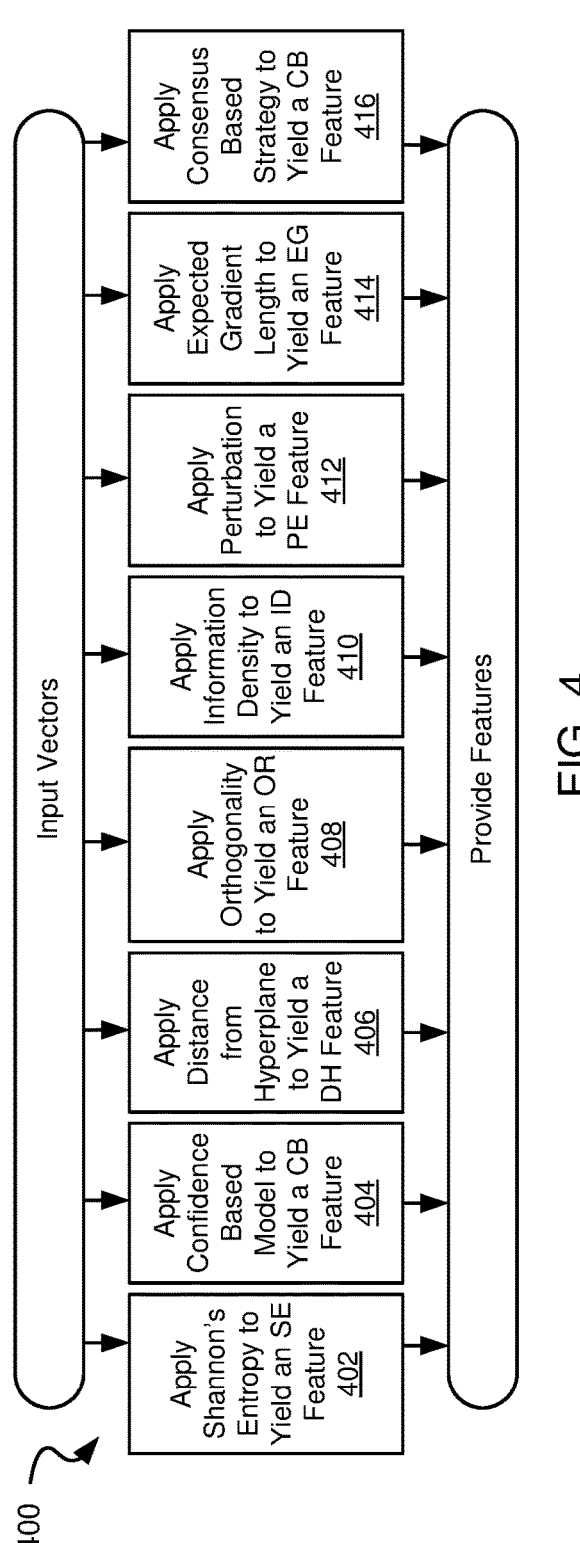
FIG. 4 is a flow diagram showing a method for performing multiple process feature calculation on labeled input vectors in accordance with some embodiments.

Turning to FIG. 4, a flow diagram 400 shows a method for performing multiple process feature calculation on each of the decision output vectors provided from the model to be trained in accordance with some embodiments. Following flow diagram 400, once there are some labeled vectors (e.g., provided in accordance with FIGS. 3A-3E above), a preliminary model is trained on the labeled vectors that aims to classify other unlabeled data. In order to identify the optimal vector to query the oracle about, a number of feature identification heuristics are applied to each unlabeled vector in the problem space. These the decision output vectors provided from the model to be trained are shown in FIG. 4 as input vectors.

In particular, Shannon's entropy heuristic may be applied to each of the decision output vectors provided from a model to be trained to yield respective SE features (block 402). Shannon's entropy is a metric that represents the total amount of information stored in a distribution, and is typically thought of as a measure of uncertainty in the field of machine learning. Shannon's entropy may be defined by the following equation:

$$\text{argmax}_x - \Sigma_i p(y_i | x; \Theta) \log(p((y_i | x; \Theta).$$

The more uniform a distribution is, the larger the entropy of the distribution. A model with a high confidence or probability score for a particular class will have low entropy, whereas a model that is not confident in deciding between classes will have high entropy, making the metric ideal for modeling uncertainty. The model to be trained may be used to determine the aforementioned Shannon's entropy heuristic.

Additionally, a confidence based heuristic may be applied to each of the of the decision output vectors using corresponding confidence values provided from the model to be trained to yield respective CB features (block 404). Entropy takes into account uncertainty across all available classes, but a model may have a hard time deciding between two classes. A margin of confidence (MC) defined by:

$$1 - (p(y^{**}_{(1)} | x; \Theta) - p(y^*_{(2)} | x; \Theta)), \text{ and/or}$$

a ratio of confidence (RC) determined by:

$$(p(y^*_{(1)} | x; \Theta) / p(y^*_{(2)} | x; \Theta)),$$

may be determined using the model to be trained. Here, $y^*_{(n)}$ denotes the $n^{th}$ most likely class based on the model's prediction probabilities. MC is the difference between the top two most confident predictions, while RC is their ratio.

An alternative approach is simply choosing the point whose classification the model has the Lowest Confidence (LC) in, as is shown in its formula argmin, $p(y_{(1)}|x)$. Despite its simplicity, LC works well with conditional random fields as well as for active learning in information extraction tasks. Thus, in different embodiments, the CB may be a different one of LC, MC, or RC. Such LC feature determination may be determined using the model to be trained.

Additionally, a distance from hyperplane heuristic may be applied to each of the of the decision output vectors provided from the model to be trained to yield respective DH features (block 406). One potential strategy for labeling points is to choose points we expect to maximally narrow the existing margins. The location of a vector with respect to a decision boundary determines the magnitude its labeling changes decision boundary position, with closer vectors having a greater affect. Different problem spaces will have differing dimensions, and varying separation between classes. In order to utilize metrics across problem spaces, we scale a vector's boundary distance by the average distance for all points in the problem space. The DH features may be determined using a linear support vector machine (SVM), a Sigmoid SVM, a radial basis function (RBF) SVM, or a polynomial SVM.

Additionally, an orthogonality heuristic may be applied to each of the of the decision output vectors provided from the model to be trained to yield respective OR features (block 408). When performing active learning in high dimensional problem spaces, it is easy for algorithms to ignore particular dimensions or pockets within a problem space due to the nature of having dimensions that are orders of magnitude larger than the number of examples. This can lead to a major disconnect between the decision boundaries of the model to be trained and the true underlying class separation. By searching for examples that are orthogonal to the space spanned by the set of labeled data, the learner is given information about dimensions that have not yet been explored. In order to utilize these principles even in problem spaces of lower dimensionality or with higher space coverage, this constraint is relaxed to allow for vectors with large angles to be selected. In some embodiments, the orthogonality metric is defined by the following equation:

$$\min_{l \varepsilon L} \cos^{-1}(<x_i, l >/|x_i| l ),$$

finds the smallest angle between the unlabeled vector $x_i$ in question and the vectors in the labeled set L.

Additionally, an information density heuristic is applied to each of the of the decision output vectors provided from the model to be train to yield respective ID features (block 410). Many active learning algorithms aim to query vectors our given model is most uncertain of, leading to a proclivity to query outliers whose labeling will have little to no effect on model performance. This motivating factor led to the development of the information density framework (IDF) defined by:

$$(\arg \max_x \Phi_A(x))(1/U\Sigma_u sim(x,x^{(u)}))^\beta.$$

Manipulating IDF, an information density metric (IDM) can be coined as follows:

$$1/U\Sigma_u sim(x,s^{(u)}).$$

IDM aims to scale the strategy by weighing it against the average similarity to all other instances in the input distribution. In the equation, sim refers to a similarity function such as cosine similarity, the dot product between normalized vectors, or Euclidean similarity, which is the reciprocal of Euclidean distance. The higher the information density, the more similar the given instance is to the rest of the data. While Cosine IDM defines the centermost cluster as most important, Euclidean IDM prefers the center of clusters.

Additionally, a perturbation heuristic may be applied to each of the of the decision output vectors provided from the model to be train to yield respective PE features (block 412). The usefulness of active learning can be extended for all model types by identifying the maximal shift in model confidence incurred by adding perturbation to each unlabeled vector. Let $\epsilon- N (0, 1)$, then calculate:

$$D_{KL}(p(y|x)\|p(y|x+\epsilon));$$

In other words, the Kullback-Leibler divergence ($D_{K L}$) of the model's prediction probabilities is calculated for a given vector before and after adding perturbation. The larger the divergence after adding $\epsilon$, the more crucial a label is to improve model performance. Said another way, the aforementioned perturbation heuristic involves processing a vector to determine a first predicted result that corresponds to the vector, and in additional adding noise to the same vector and processing the noise augmented vector to determine a second predicted result. The first predicted result is then compared with the second predicted result to yield a difference that is attributed to the addition of the noise. As an example, where the first predicted result identifies a different class than the second predicted result and the change is significant, the vector is one that lies at a junction of the classes (perhaps, for example, in a region of interest as described above) and thus represents a vector that is a better candidate for labeling by an oracle than other vectors where a change in class or a change in class, but only a small difference is noted. Thus, the addition of noise does not test how strong or robust the model is, but rather flags vectors that are more valuable to training a model. Such PE feature determination may be determined using the model to be trained.

Additionally, an expected gradient heuristic may be applied to the input vectors to yield respective EG features (block 414). Discriminative models are typically trained using gradient-based optimization; the amount a model will be changed at a given time can be quantified by the expected gradient length. In order to make the largest updates to the model possible, it will be optimal to choose a vector x that leads to the largest change in our objective function 1. as determined via the following equation:

$$\arg \max_x \Sigma |p(y_i|x;\Theta)\|\nabla LU(x|y_i;\Theta)\|.$$

The vector's gradient for a possible class is scaled by its prediction probability as output by the current model. Such EG feature determination may be determined using a Softmax Regression model.

Additionally, a consensus based heuristic may be applied to the input vectors to yield respective CB features (block 416). Such consensus based strategies utilize multiple models in various combinations in order to identify vectors of interest. Query-by-committee consensus has a committee composed of multiple models trained on our set of labeled data with each model having a unique initialization. Co-Training and Co-Learning approach consensus through different lenses, using differing subsets of features and using different model types altogether respectively. No matter the consensus strategy, they all function in a similar way. The vectors that models disagree the most over have the most potential information to give; these vectors are the most optimal to label. The aforementioned Query by committee and Co-Training feature determinations may be determined using the model to be trained, and the aforementioned Co-Learning feature determination may be determined using a Percepton model, a Random Forest model, or a Softmax regression model. While FIG. 4 is described as using the aforementioned algorithms and strategies to identify features of input vectors, one of ordinary skill in the art will appreciate other algorithms and/or strategies that may be used in addition to or in place of one or more of the algorithms and strategies discussed above.

Vector Ranking

Figure 5:
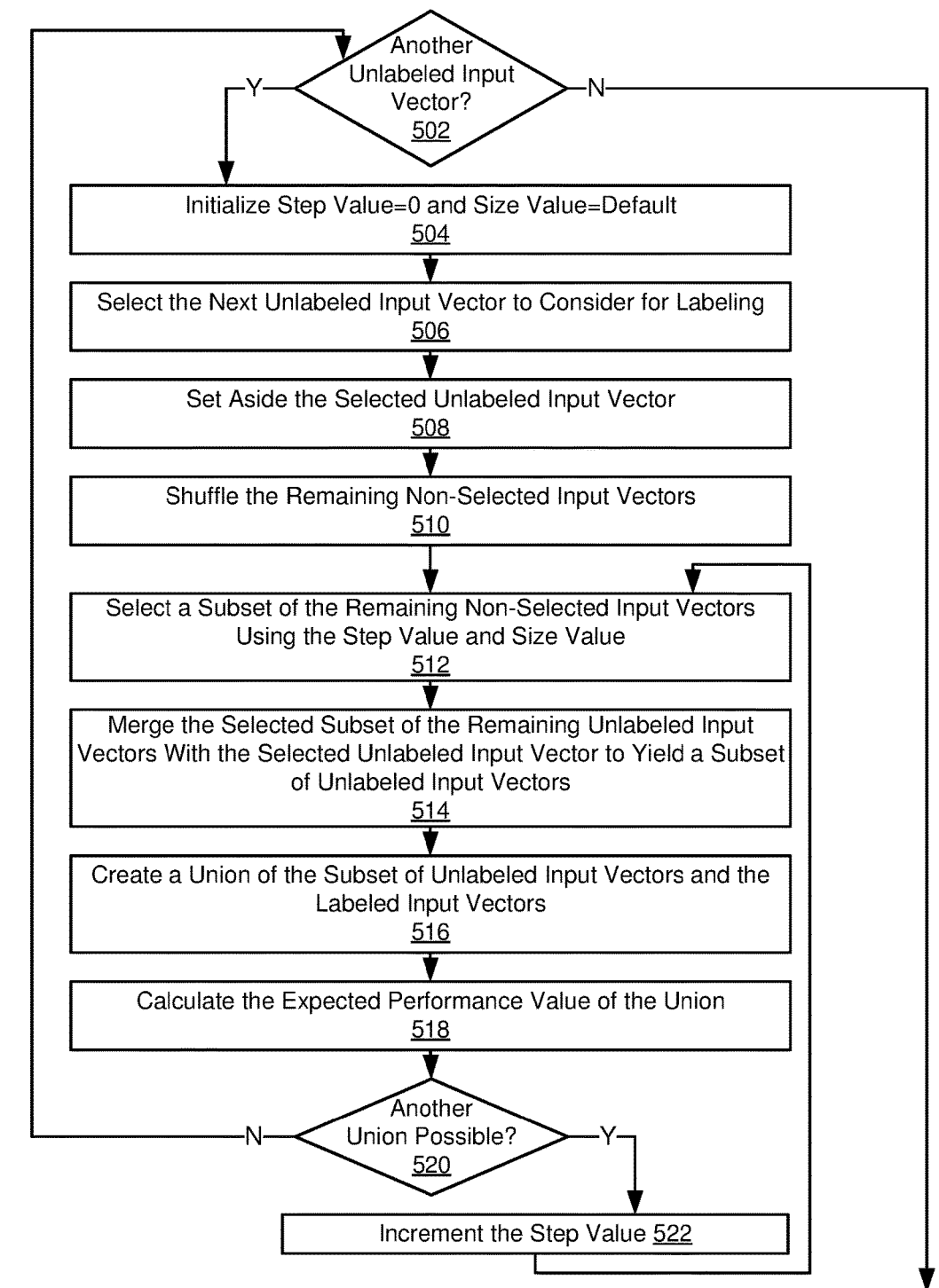
FIG. 5 is a flow diagram showing a method in accordance with some embodiments for ranking unlabeled input vectors in accordance with various embodiments.

Turning to FIG. 5, a flow diagram 500 shows a method in accordance with some embodiments for ranking unlabeled input vectors in the data from the problem space using multiple features determined and/or calculated using different feature generation processes (e.g., the various features generated using the method in flow diagram 400 discussed above in relation to FIG. 4). In some embodiments, the processes of flow diagram 500 may be implemented in a VQNN. Following flow diagram 500, the process is repeated for each unlabeled vector and thus begins before each processing of an unlabeled input vector by determining whether any unlabeled input vectors remain to be processed (block 502). Where one or more unlabeled input vectors remain to be processed (block 502), a step value is initialized to zero (0) and a size value is set equal to a default value (block 504). In some embodiments, the size value may be user programmable. Based upon the disclosure provided herein, one of ordinary skill in the art will recognize a variety of step values and/or size values that may be used in relation to different embodiments.

Figure 6A:
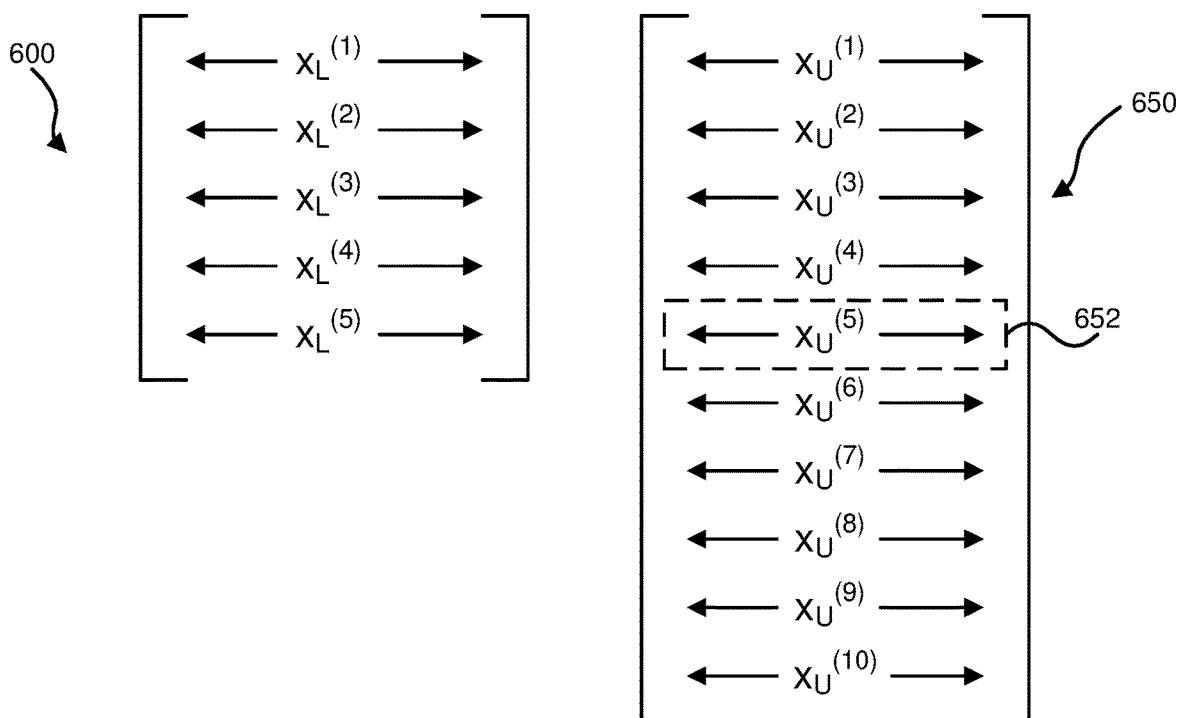
FIGS. 6A-6E is an example graphically depicting the vector ranking process of FIG. 5.
Figure 6B:
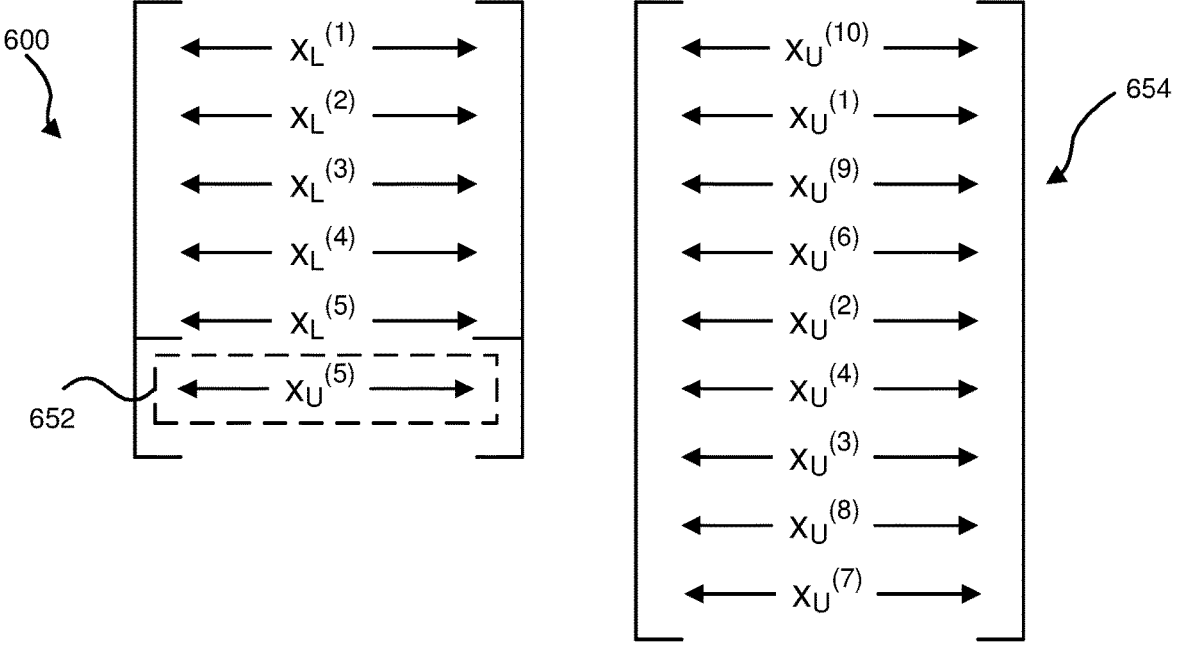

The next one of the unlabeled input vectors is selected for potential labeling (block 506) and this selected unlabeled input vector is removed from the other unlabeled input vectors and set aside (block 508). Turning to FIG. 6A, an example of a set of labeled input vectors ($X_L^{(n)}$) 600 and a set of unlabeled input vectors ($X_U^{(n)}$) 650 are shown. One of unlabeled input vectors 650 has been selected ($X_U^{(5)}$) as indicated by the dashed box 652. Returning to FIG. 5, the unlabeled input vectors remaining after removal of the selected unlabeled input vector are shuffled (i.e., the order of the vectors is changed). Turning to FIG. 6B, selected unlabeled input vector ($X_U^{(5)}$) 652 has been removed from unlabeled input vectors 650, leaving only unlabeled input vectors 654. Unlabeled input vectors 654 remaining (i.e., originally ordered $X_U^{(1)}$, $X_U^{(2)}$, $X_U^{(3)}$, $X_U^{(4)}$, $X_U^{(6)}$, $X_U^{(7)}$, $X_U^{(8)}$, $X_U^{(9)}$, and $X_U^{(10)}$) after removal of selected unlabeled input vector ($X_U^{(5)}$) 652 are shuffled to yield an order $X_U^{(10)}$, $X_U^{(1)}$, $X_U^{(9)}$, $X_U^{(6)}$, $X_U^{(2)}$, $X_U^{(4)}$, $X_U^{(3)}$, $X_U^{(8)}$, and $X_U^{(7)}$.

Figure 6D:
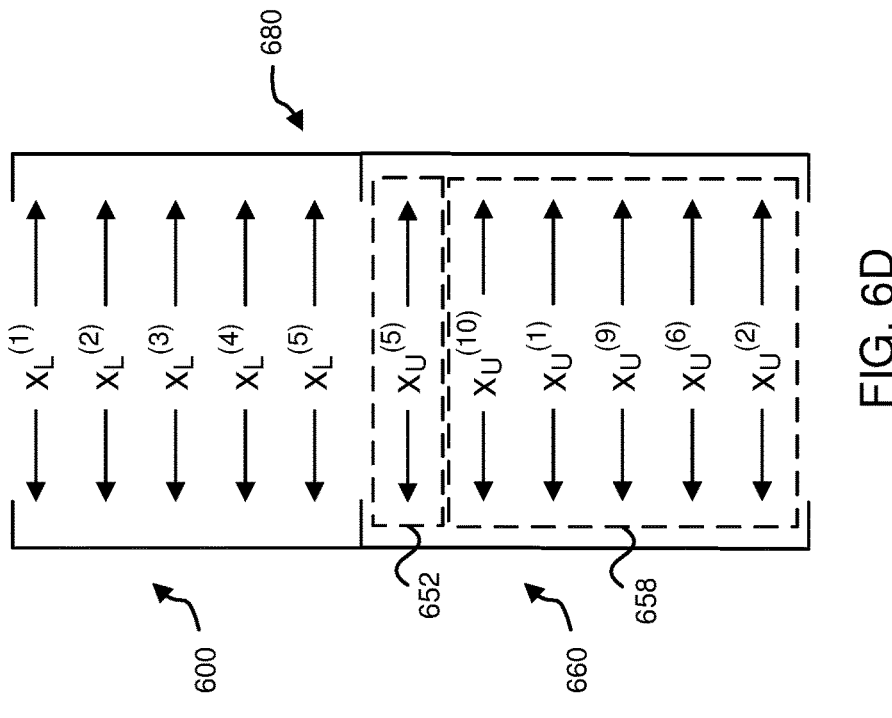
Figure 6C:
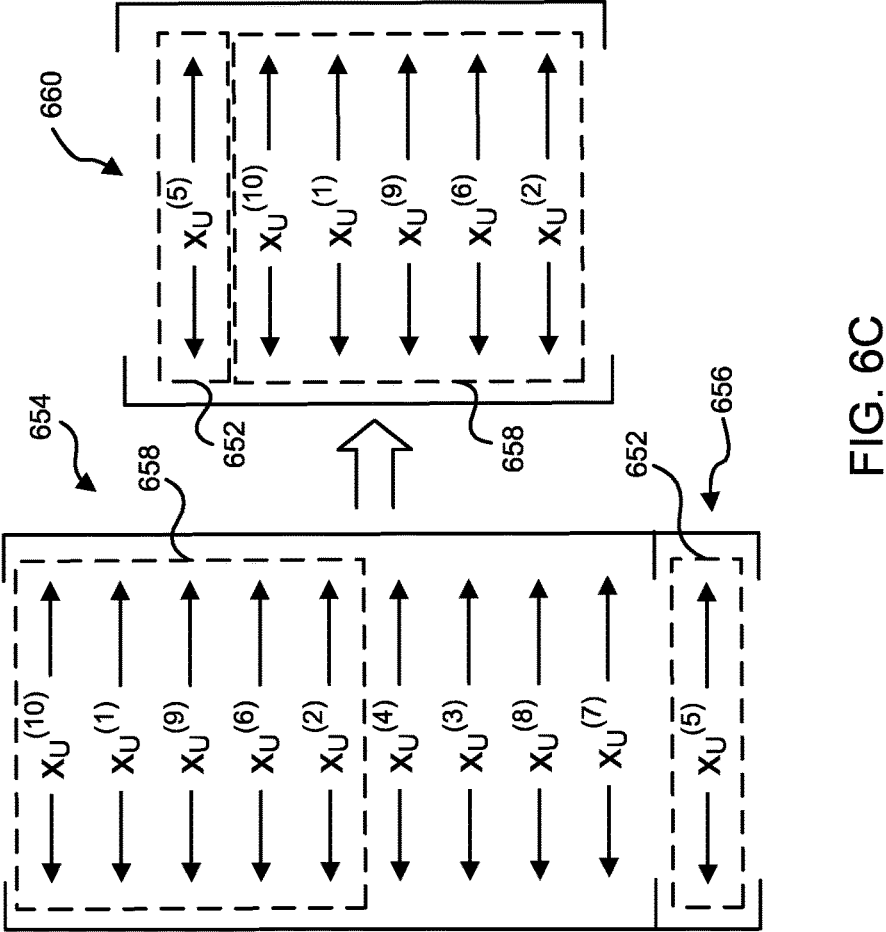

A subset of the unlabeled input vectors remaining after removal of the selected unlabeled input vector is selected using the step value and the size value (block 512). Thus, as an example, where the step value is zero (0) and the size value is four (4) the first four vectors of the remaining unlabeled input vectors are selected. As another example, where the step value is one (1) and the size value is eight (8) the second through the ninth of the remaining unlabeled input vectors are selected. The selected subset of the remaining unlabeled input vectors are merged with the selected unlabeled input vector to yield a union of unlabeled input vectors (block 514). Turning to FIG. 6C, an example, for a step value of zero (0) and a size value of five (5) is shown. As shown, the first five vectors (i.e., $X_U^{(10)}$, $X_U^{(1)}$, $X_U^{(9)}$, $X_U^{(6)}$, and $X_U^{(2)}$) are selected as a subset 658, and subset 658 is joined with selected unlabeled input vector 652 to form a subset of unlabeled input vectors 660.

Returning to FIG. 5, a union of the subset of unlabeled input vectors and the labeled input vectors is formed (block 516). Turning to FIG. 6D, an example of a union 680 subset of unlabeled input vectors 660 and labeled input vectors 600 is shown. Returning to FIG. 5, a minimum expected performance value and an optimal expected performance value for the union is calculated (block 518). In some embodiments, the expected performance values are calculated in accordance with the following equations:

$$x_{min} = \text{arg min}_x |E_{future}; \text{ and}$$

$$x_{optimal} = \text{arg max}_x |E_{future}$$

$E_{future}$ is the expected effect of labeling the vector on future performance of other unlabeled vectors in the future. In layman terms, a sliding window is used to select a group of vectors to label alongside the vector currently in consideration; each time the window slides the group of vectors to label changes but the vector we are considering will always be a part of the set. For each group of vectors selected, each vector in the group is added to the labeled vector set and total increase in performance is evaluate. After evaluation, the group of vectors are removed from the labeled vector set. After all groups of vectors are tried out all groupings, the average model increase for each of the groups that included the considered vector is calculated. This allows for estimation of the performance of the model after labeling the considered vector in the future, after other vectors have been labeled as well. Such a comparison value is the $E_{future}$ of the foregoing equations. In order to convert the $E_{future}$ values to rankings, the intermediate values listed above are calculated to facilitate this transformation. Such a roundabout way to determine the best vectors to label is used as it is helpful to consider how a vector carves up the search space of the unlabeled vector set if it were to be labeled. Supbar vector selection can dramatically hamper how effective the labeling process becomes when future vectors are considered for labeling, leading to diminishing returns rapidly. For this reason, all of the unlabeled vectors are considered rather than simply determining which vector is closest to the expected result. The aforementioned values are stored in relation to the selected unlabeled input vector and the particular union.

Figure 6E:
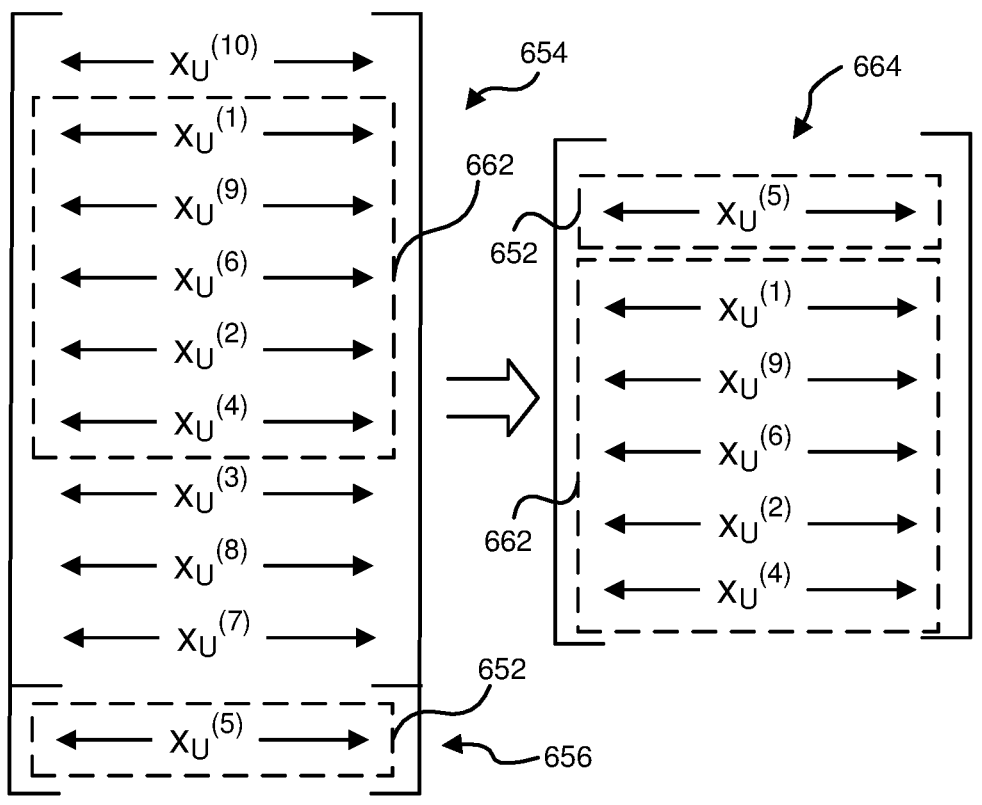

It is determined whether another union is possible for the selected unlabeled input vector (block 520). Another union is possible where the step value plus one (1) plus the size value does not extend beyond the end of number of unlabeled input vectors remaining after removal of the selected unlabeled input vector. Where another union is possible (block 520), the step value is incremented (block 522) and the processes of blocks 512-520 are repeated for the selected unlabeled input vector using the new step value and the previously set size value. Turning to FIG. 6E, an example is shown where the step value is incremented to one (1) (it was previously zero (0)). As shown, a subset of unlabeled input vectors 664 is created from a combination of selected unlabeled input label 652 and a subset 662 selected using the step value (i.e., 1) and the size value (i.e., 5).

Returning to FIG. 5, where no other unions with the selected unlabeled input vector are possible (block 520), the previously selected unlabeled input vector is returned to the other unlabeled input vectors and it is determined whether any of the unlabeled input vectors remain to be selected and processed (block 502). Where additional unlabeled input vectors remain to be processed (block 502), the processes of blocks 504-522 are repeated for the next of the unlabeled input vectors.

Alternatively, where no unlabeled input vectors remain to be processed (block 502), all of the unlabeled input vectors are ranked using the average of all expected performance values for the multiple unions in which the respective unlabeled input vector was processed (block 524). This includes averaging all of the $x_{min}$ values for the unions in which the respective unlabeled input vector was processed to yield an $x_{min,average}$ value; and averaging all of the $x_{optimal}$ values for the unions in which the respective unlabeled input vector was processed to yield an $x_{optimal,average}$ value. Using these average values, a rank for the respective vector is calculated in accordance with the following equation:

$$\text{rank}_x = (x - x_{min,average})(x_{opimal,average} - x_{min,average}).$$

For the most optimal vectors (in this case the highest ranked vectors) extra care is taken to assure that the relative rankings are accurate. This helps to assure that the best vector(s) are ultimately selected for labeling. To this end, in some embodiment the following loss function is applied:

$$\frac{1}{N}\sum_i \exp\left(-\frac{(y_i - 1)^2}{2\tau^2}\right)(y_i - \hat{y}_i)^2$$

where yi is the true ranking, yihat is the predicted ranking, N is the number of vectors considered, and $\tau$ is a hyper parameter that controls how quickly weight falloff occurs.

In some embodiments, training $\tau$ relies on synthetic data rather than real world datasets due to the relatively low costs involved in obtaining additional problem spaces to incorporate into our training set. Such an approach allows for creation of larger and more powerful models that otherwise would have suffered from over-fitting less as the amount of data increases. Such an approach can yield a large set of potential values for $\tau$. To reduce this large set, an optimization approach relying on Tree Parzen Estimation (TPE) can be used. Since TPE tracks previous evaluation results in order to map hyper parameter sets to probabilistic models, this enabled us to tune $\tau$ faster and has empirically shown can lead to better results than alternative approaches to hyper parameter tuning.

Figure 7:
FIG. 7 shows an example VQNN that may be used to perform the vector ranking processes discussed in relation to FIG. 5.

Turning to FIG. 7, an example VQNN 700 is shown that may be used to perform the vector ranking processes discussed in relation to FIG. 5. VQNN 700 uses hidden layers having Tanh activation (Tanh Density Connected Network Units 704, and Tanh Double Residual units 706, 708) with later layers (Tanh Density Connected Network Units 710, and Tanh Double Residual units 712, 714) being slightly larger than those in the beginning. Since vector rankings are expressed in non-negative values, an rectified linear unit output 716 is used Automated, Adaptive Vector Labeling Turning to FIG. 8, a flow diagram 800 shows a method for automated, adaptive vector labeling in accordance with various embodiments. Following flow diagram 800, the decision output vectors and confidence outputs from the model to be trained is received after completion of a vector ranking and non-automated labeling process is received (block 802). The decision output vectors each indicates what the model to be trained believes the corresponding input vector to represent, and the confidence output indicates the degree of confidence the model has that the decision output vector is correct. As one example, the decision output vectors and corresponding confidence outputs may be provided as a result of the model training performed in relation to block 214 of FIG. 2.

Each of the decision output vectors that are both unlabeled and exhibit a confidence greater than a programmable threshold value are selected to yield high confidence, unlabeled vectors (bock 804). An auto-annotation classification model is applied to the high confidence, unlabeled vectors to classify the individual vectors for labeling. In some embodiments, the auto-annotation classification model is implemented as a vector pseudo labeling neural network (VPLNN) operates to predict whether the given vector has been correctly labeled by the model to be trained using the received decision output vector and corresponding confidence value. The auto-annotation classification model provides an output indicating that the particular high confidence, unlabeled vector was validly labeled by the model to be trained, or indicating that the particular high confidence, unlabeled vector was not validly labeled by the model to be trained.

Each of the high confidence, unlabeled vectors processed by the auto-annotation classification model are then processed (block 808). This processing continues until all of the high confidence, unlabeled vectors have been considered. Where another high confidence, unlabeled vector remains to be processed (block 808), it is determined whether the application of the auto-annotation classification model found the label applied by the model to be trained was valid (i.e., correct) (block 810). Where the application of the auto-annotation classification model did not find the label applied by the model to be trained valid (block 810), the next high confidence, unlabeled vector is selected for processing (block 808).

Alternatively, where the label was found valid (block 810), the particular high confidence, unlabeled vector is compared with other labeled vectors that have the same label to determine whether the particular high confidence, unlabeled vector is similar to at least one other previously labeled vector (block 812). This similarity comparison is performed to ensure that the vector satisfies the smoothness constraint, where vectors of the same class are closer in distance to each other than they are to vectors of a differing class. Enforcement of this constraint can be performed using a variety of distance measurements, such as Euclidean distance, Manhattan distance, as well as Mahalanobis Distance. For example, if our target model labels a vector with high confidence as a dog and our VAANN identifies the vector as being correctly classified, yet it is closest to a vector corresponding to a cat, we will not annotate the vector. However, if the same vector was indeed closest to another dog vector, then we can annotate this vector as a dog with certainty. By assuring that the particular high confidence, unlabeled vector is similar to at least one other previously labeled vector, any labeling that is ultimately applied will not be to vectors that are novel. While such novel vectors may have been accurately predicted for labeling, the labeling of novel vectors is preserved for the oracle to reduce the possibility of introducing mis-labeled vectors in the automated labeling process, and the damage that such cause to the model to be trained.

Where the particular high confidence, unlabeled vector is similar to at least one other previously labeled vector (block 812), the predicted label is added to the particular high confidence, unlabeled vector and the newly labeled vector is added to the growing list of labeled vectors (block 814). Our target model is then retrained on the modified set of labeled vectors. Either where the particular high confidence, unlabeled vector is not similar to at least one other previously labeled vector (block 812) or labeling of the vector has been done (block 814), the next high confidence, unlabeled vector is selected for processing (block 808).

Once no other high confidence, unlabeled vectors remain for processing (block 808), the model to be trained is again trained using the augmented labeled dataset along with other unlabeled vectors in the data from the problem space (block 816). The confidence value outputs from the model to be trained are queried to determine whether the process resulted in any decision output vectors with a confidence that exceeds the programmable user threshold (block 818). Where additional decision output vectors were found with a confidence that exceeds the programmable user threshold (block 818), the process of automated, adaptive labeling is repeated. Otherwise, the process of automated, adaptive labeling is terminated and processing is returned to vector ranking and non-automated vector labeling (e.g., block 212 of FIG. 2).

Once no other high confidence, unlabeled vectors remain for processing (block 808), the model to be trained is again trained using the augmented labeled dataset along with other unlabeled vectors in the data from the problem space (block 816). The confidence value outputs from the model to be trained are queried to determine whether the process resulted in any decision output vectors with a confidence that exceeds the programmable user threshold (block 818). Where additional decision output vectors were found with a confidence that exceeds the programmable user threshold (block 818), the process of automated, adaptive labeling is repeated. Otherwise, the process of automated, adaptive labeling is terminated and processing is returned to vector ranking and non-automated vector labeling (e.g., block 212 of FIG. 2).

Figure 9:
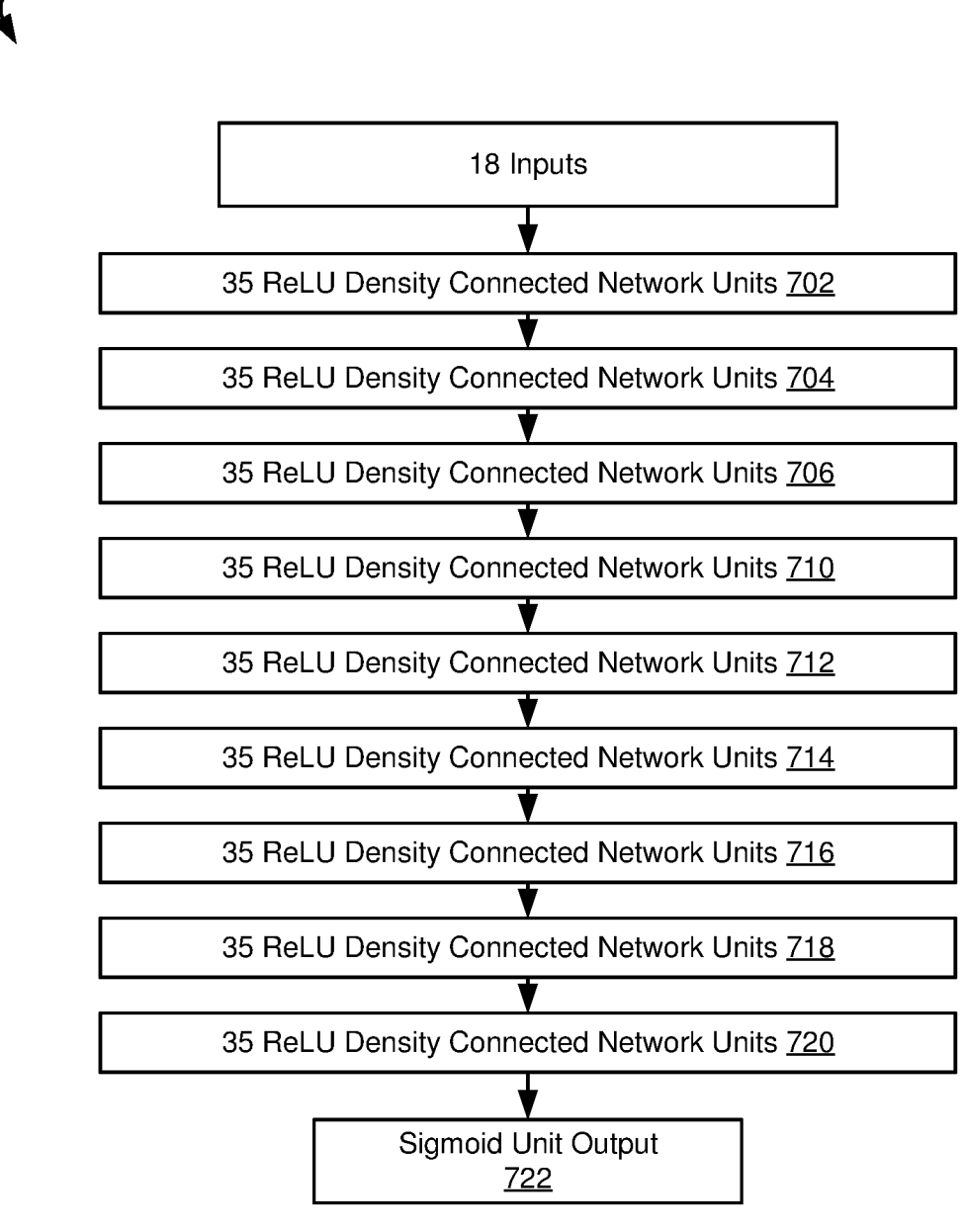
FIG. 9 shows an example VPLNN that may be used to perform the vector labeling processes discussed in relation to FIG. 8.

Turning to FIG. 9, an example Vector Pseudo labeling Neural Network (VPLNN) 900 is shown that may be used to perform the vector labeling processes discussed in relation to FIG. 9. VPLNN 900 is a ReLU focused architecture using a series of ReLU Density Residual Units 702, 704, 706, 708, 710, 712, 714, 716, 718, 720 and a Sigmoid Unit Output 722.

Figure 10:
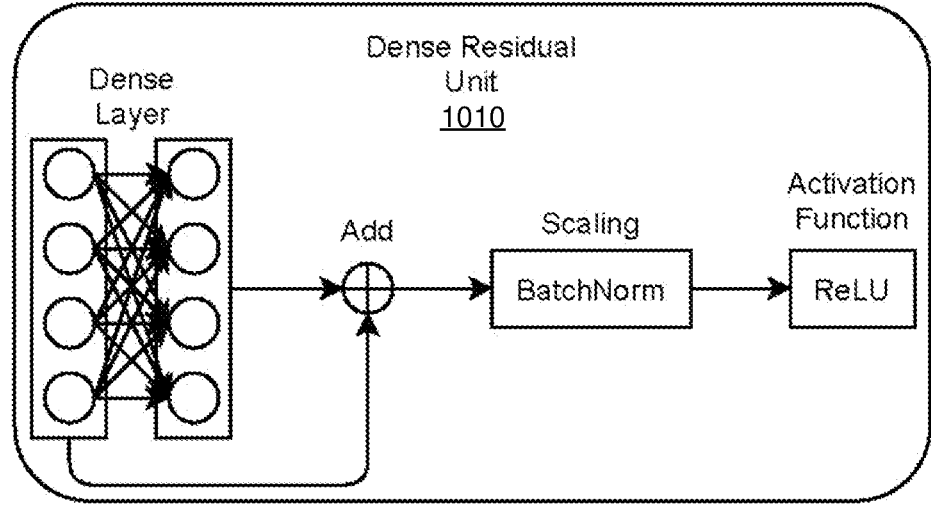
FIG. 10 shows a DRU that may be used in relation to various embodiments.

Turning to FIG. 10, a dense residual unit (DRU) 1010 is shown that may be used to implement the aforementioned VQNN and VPLNN systems in relation to various embodiments discussed herein. It is noted that while DRU 1010 is shown with a ReLU activation function that other activation functions are possible in accordance with other embodiments. Such activation functions may include, but are not limited to, Tanh or Sigmoid activation functions. Based upon the disclosure provided herein one of ordinary skill in the art will recognize a variety of activation functions that may be used in DRU 1010 in accordance with different embodiments. The inputs to the VPLNN and the VQNN are the same. What is different, however, is the use of the output of the VPLNN and the output of the VQNN.

Figure 11:
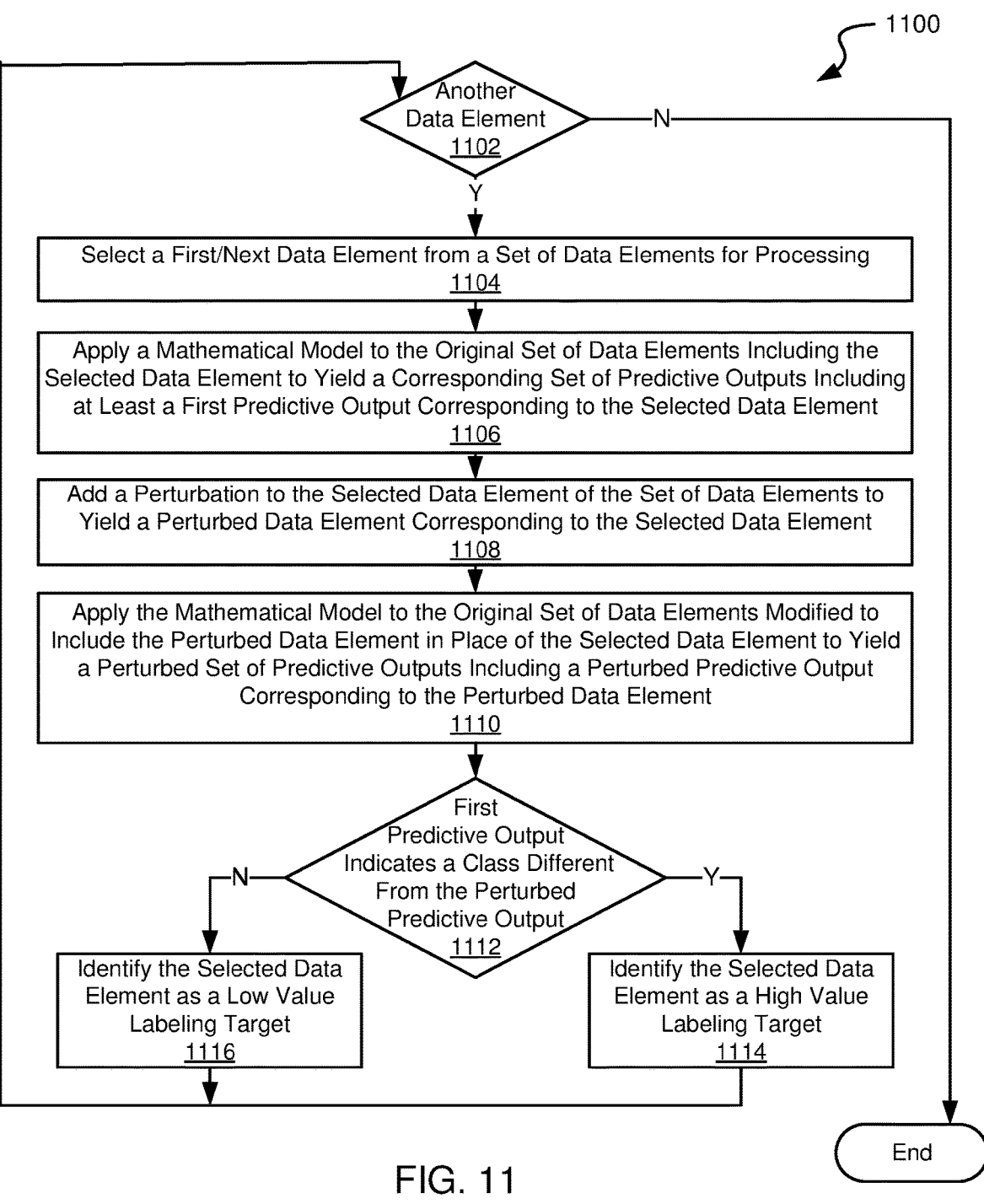
FIG. 11 is a flow diagram showing a method in accordance with some embodiments for using perturbation to identify high value labeling targets.

Turning to FIG. 11, a flow diagram 1100 shows a method in accordance with some embodiments for using perturbation to identify high value labeling targets. Following flow diagram 1100, it is determined whether another data element in a set of data elements remains to be processed (block 1102). The processes of flow diagram are repeated for each element within a set of data elements in an effort to identify any data elements that would likely yield value to a model if they were labeled (i.e., high value labeling targets). The first or next data element in the set of data elements is selected for processing (block 1104). During the first time the processes of flow diagram 1200 are to be applied any data element (i.e., a first data element) from the set of data elements is selected for processing, during subsequent times the processes of flow diagram 1200 are to be applied any previously unprocessed data element (i.e., a next data element) from the set data elements is selected for processing.

A mathematical model is applied to the original set of data elements including the selected data element to yield a corresponding set of predictive outputs (block 1106). One of the set of predictive data elements corresponds to the selected data element. A perturbation is added to the selected data element to yield a perturbed data element that corresponds to the selected data element (block 1108).

The same mathematical model is applied to the original set of data elements modified to replace the selected data element with the perturbed data element (block 1110). Application of the mathematical model yields a perturbed set of predictive outputs that includes a perturbed predictive output corresponding to the perturbed data element.

It is determined whether the first predictive output indicates a class that is different from a class indicated by the perturbed predictive output (block 1112). Where adding the perturbation to the selected data element causes the mathematical model to predict a different class, then the perturbation made a significant difference to the mathematical model. As such, the selected data element is considered a high value labeling target and the selected data element is identified as a high value labeling target (block 1114). Otherwise, the selected data element is identified as a low value labeling target (block 1116). The processes of blocks 1104-1116 are repeated for each data element in the set of data elements and identified as a high value labeling target or not. This identification information is used in relation to the labeling processes discussed above in relation to FIGS. 4-9

Turning to FIG. 12, a flow diagram 1200 shows another method in accordance with some embodiments for using perturbation to identify high value labeling targets. Following flow diagram 1200, it is determined whether another data element in a set of data elements remains to be processed (block 1202). The processes of flow diagram are repeated for each element within a set of data elements in an effort to identify any data elements that would likely yield value to a model if they were labeled (i.e., high value labeling targets). The first or next data element in the set of data elements is selected for processing (block 1204). During the first time the processes of flow diagram 1200 are to be applied any data element (i.e., a first data element) from the set of data elements is selected for processing, during subsequent times the processes of flow diagram 1200 are to be applied any previously unprocessed data element (i.e., a next data element) from the set data elements is selected for processing.

A mathematical model is applied to the original set of data elements including the selected data element to yield a corresponding set of predictive outputs (block 1206). One of the set of predictive data elements corresponds to the selected data element. A perturbation is added to the selected data element to yield a perturbed data element that corresponds to the selected data element (block 1208).

The same mathematical model is applied to the original set of data elements modified to replace the selected data element with the perturbed data element (block 1210). Application of the mathematical model yields a perturbed set of predictive outputs that includes a perturbed predictive output corresponding to the perturbed data element.

A first divergence corresponding to the first predictive output and a second divergence corresponding to the perturbed predictive output are calculated (block 1212). Each of the aforementioned divergence values are calculated in accordance with the following equation:

US 12,645,922 B2

29

$D_{KL}(p(y|x)\|p(y+\epsilon))$ where $\epsilon \sim N(0, 1)$. Then, a difference between the first divergence and the second divergence is calculated to yield a divergence difference (block 1214). This divergence difference is an indication of how significant of a change the addition of perturbation to the selected data element yielded in the output of the mathematical model. Data elements that when perturbed yield the most significant divergence difference are good candidates for labeling. In contrast, data elements that when perturbed yield only lesser changes in the output of the mathematical model are less important when being considered for labeling.

The magnitude of the divergence difference is compared against a threshold value (block 1216). In some cases, the threshold value is user programmable. Where the magnitude of the divergence difference exceeds the threshold value (block 1216), the selected data element is identified as a high value labeling target (block 1218). Otherwise, the selected data element is identified as a low value labeling target (block 1220). The processes of blocks 1204-1220 are repeated for each data element in the set of data elements and identified as a high value labeling target or not. This identification information is used in relation to the labeling processes discussed above in relation to FIGS. 4-9.

Turning to FIG. 13, a flow diagram 1300 shows a method in accordance with some embodiments for using an orthogonality heuristic to identify ignored labeling targets. Following flow diagram 1300, a set of angle values for a selected unlabeled data vector is initialized as null (block 1302). This set of angle values is used in the process of flow diagram 1300 to hold all of the angle values calculated between a selected unlabeled data vector and each of the labeled data vectors included in a set of data vectors that are being processed.

It is determined whether another unlabeled data vector remains for processing in a set of data vectors that includes both labeled data vectors and unlabeled data vectors (block 1304). The processes of flow diagram are repeated for each unlabeled data vector within the set of data vectors in an effort to identify any data vectors that are likely to be ignored and may yield value to a model if they were labeled (i.e., ignored labeling targets). The first or next unlabeled data vector in the set of data vectors is selected for processing (block 1306). During the first time the processes of flow diagram 1300 are to be applied any unlabeled data vector (i.e., a first unlabeled data vector) from the set of data vectors is selected for processing, during subsequent times the processes of flow diagram 1300 are to be applied any previously unprocessed, unlabeled data vector (i.e., a next unlabeled data vector) from the set data vectors is selected for processing.

It is determined whether another labeled data vector remains for processing in the set of data vectors (block 1308). The process of flow diagram 1300 considers all labeled vectors in relation to the selected unlabeled data vector (i.e., the unlabeled data vector selected in block 1306). Where another labeled data vector remains for consideration (block 1310), The first or next unlabeled data vector in the set of data vectors is selected for processing (block 1306). During the first time the processes of blocks 1308-1314 are applied, any labeled data vector (i.e., a first labeled data vector) from the set of data vectors is selected for processing, during subsequent times any previously unconsidered, labeled data vector (i.e., a next labeled data vector) from the set data vectors is selected for processing.

An angle between the selected unlabeled data vector and the selected labeled data vector is calculated to yield an angle value (block 1312). This angle value may be calculated using any approach known in the art for calculating an angle between two vectors. This calculated angle value is included in the set of angle values for the selected unlabeled vector (block 1314). Again the processes of blocks 1308-1314 are repeated for the selected unlabeled data vector and each of the labeled data vectors in the set of data vectors.

Once an angle value between the selected unlabeled vector and each of the labeled data vectors in the set of data vectors has been calculated and included in the set of angle values for the selected unlabeled vector (block 1308), a minimum angle within the set of angle values is identified (block 1316). This minimum angle is the minimum angle between the selected unlabeled data vector and any labeled data vector within the set of data vectors. This minimum angle is compared with a threshold value (block 1318). Where the minimum angle is greater than a threshold value (block 1318), the selected unlabeled data vector is identified as an ignored labeling target (block 1320). Otherwise, the selected unlabeled data vector is identified as a non-ignored labeling target (block 1322).

While embodiments of the present disclosure have been illustrated and described, numerous modifications, changes, variations, substitutions, and equivalents will be apparent to those skilled in the art. Thus, it will be appreciated by those of ordinary skill in the art that the diagrams, schematics, illustrations, and the like represent conceptual views or processes illustrating systems and methods embodying various non-limiting examples of embodiments of the present disclosure. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing the particular embodiment. Those of ordinary skill in the art further understand that the exemplary hardware, software, processes, methods, and/or operating systems described herein are for illustrative purposes and, thus, are not intended to be limited to any particular named. While the foregoing describes various embodiments of the disclosure, other and further embodiments may be devised without departing from the basic scope thereof.

What is claimed is:

1. A method comprising:
   receiving, by a processing resource, at least a first decision output and a first confidence value corresponding to the first decision output and a second decision output and a second confidence value corresponding to the second decision output, wherein the first decision output and the second decision output are included in a set of decision outputs from a first mathematical model;
   selecting, by the processing resource, the first decision output for inclusion in a subset of the set of decision outputs based upon the first confidence value exceeding a confidence threshold value;
   applying, by the processing resource, a second mathematical model to a dataset including the subset of the set of decision outputs, wherein the second mathematical model provides an updated decision output corresponding to the first decision output, wherein the second mathematical model comprises vector pseudo-labelling neural network (VPLNN) having dense residual units and a sigmoid output configured to output a validity indication for the first decision output based on (i) the first decision output vector and (ii) the corresponding confidence value;

performing automated labelling by selecting, by the processing resource, the first decision output for labelling only when (i) the validity indication is positive and (ii) the first decision output matches the updated decision output and (iii) the first decision output is similar to at least one previously labelled decision output;

based at least on the automated labeling, automatically updating, by the processing resource, a pre-trained model by appending the newly labelled decision outputs to a labelled training dataset to create an augmented dataset and retraining the pre-trained model using the augmented dataset to protect against temporal shifts in data, thereby increasing a longevity of the pre-trained model, wherein the automated labelling and the updating are performed automatically by the processing resource without human review of the selected labelled items; and managing a flow of subsequent data utilizing the pre-trained model.

2. The method of claim 1, wherein the dataset including the subset of the set of decision outputs further includes a plurality of previously labelled decision outputs.

3. The method of claim 2, the method further comprising:

labelling, by the processing resource, the first decision output to yield a newly labelled decision output; and adding, by the processing resource, the newly labelled decision output to the plurality of previously labelled decision outputs.

4. The method of claim 2, the method further comprising:

comparing, by the processing resource, the first decision output with one of the plurality of previously labelled decision outputs to yield a comparison result; and wherein selecting the first decision output for labelling is done based at least in part on the combination of the first decision output and the updated decision output, and upon the comparison result.

5. The method of claim 4, wherein the comparison result indicates that the one of the plurality of previously labelled decision outputs is similar to the first decision output.

6. The method of claim 1, the method further comprising:

excluding, by the processing resource, the second decision output from inclusion in the subset of the set of decision outputs based upon the second confidence value being less than the confidence threshold value.

7. The method of claim 1, wherein selecting the first decision output for labelling based at least in part on the combination of the first decision output and the updated decision output includes:

selecting the first decision output for labelling based at least in part on the first decision output matching the updated decision output.

8. The method of claim 1, wherein the second mathematical model is a neural network model.

9. A system comprising:

a processing resource;

a non-transitory computer-readable medium, coupled to the processing resource, having stored therein instructions that when executed by the processing resource cause the processing resource to:

receive at least a first decision output and a first confidence value corresponding to the first decision output and a second decision output and a second confidence value corresponding to the second decision output, wherein the first decision output and the second decision output are included in a set of decision outputs from a first mathematical model;

select the first decision output for inclusion in a subset of the set of decision outputs based upon the first confidence value exceeding a confidence threshold value;

apply a second mathematical model to a dataset including the subset of the set of decision outputs, wherein the second mathematical model provides an updated decision output corresponding to the first decision output, wherein the second mathematical model comprises vector pseudo-labelling neural network (VPLNN) having dense residual units and a sigmoid output configured to output a validity indication for the first decision output based on (i) the first decision output and (ii) the corresponding confidence value;

perform automated labelling by selecting the first decision output for labelling only when (i) the validity indication is positive and (ii) the first decision output matches the updated decision output and (iii) the first decision output is similar to at least one previously labelled decision output;

based at least on the automated labeling, automatically update, by the processing resource, a pre-trained model by appending the newly labelled decision outputs to a labelled training dataset to create an augmented dataset and retraining the pre-trained model using the augmented dataset to protect against temporal shifts in data, thereby increasing a longevity of the pre-trained model wherein the automated labelling and the updating are performed automatically by the processing resource without human review of the selected labelled items; and manage a flow of subsequent data utilizing the pre-trained model.

10. The system of claim 9, wherein the dataset including the subset of the set of decision outputs further includes a plurality of previously labelled decision outputs.

11. The system of claim 10, wherein the instructions that when executed by the processing resource further cause the processing resource to:

label the first decision output to yield a newly labelled decision output; and add the newly labelled decision output to the plurality of previously labelled decision outputs.

12. The system of claim 10, wherein the instructions that when executed by the processing resource further cause the processing resource to:

compare the first decision output with one of the plurality of previously labelled decision outputs to yield a comparison result; and wherein selecting the first decision output for labelling is done based at least in part on the combination of the first decision output and the updated decision output, and upon the comparison result.

13. The system of claim 12, wherein the comparison result indicates that the one of the plurality of previously labelled decision outputs is similar to the first decision output.

14. The system of claim 9, wherein the instructions that when executed by the processing resource further cause the processing resource to:

exclude the second decision output from inclusion in the subset of the set of decision outputs based upon the second confidence value being less than the confidence threshold value.

15. The system of claim 9, wherein selecting the first decision output for labelling based at least in part on the combination of the first decision output and the updated decision output includes:

selecting the first decision output for labelling based at least in part on the first decision output matching the updated decision output.

16. A non-transitory computer-readable storage medium embodying a set of instructions, which when executed by one or more processing resources of a computer system, causes the one or more processing resources to:

receive at least a first decision output and a first confidence value corresponding to the first decision output and a second decision output and a second confidence value corresponding to the second decision output, wherein the first decision output and the second decision output are included in a set of decision outputs from a first mathematical model;

select the first decision output for inclusion in a subset of the set of decision outputs based upon the first confidence value exceeding a confidence threshold value;

apply a second mathematical model to a dataset including the subset of the set of decision outputs, wherein the second mathematical model provides an updated decision output corresponding to the first decision output, wherein the second mathematical model comprises vector pseudo-labelling neural network (VPLNN) having dense residual units and a sigmoid output configured to output a validity indication for the first decision output based on (i) the first decision output and (ii) the corresponding confidence value;

perform automat perform automated labelling by selecting the first decision output for labelling only when (i)

the validity indication is positive and (ii) the first decision output matches the updated decision output and (iii) the first decision output is similar to at least one previously labelled decision outputted labelling by selecting the first decision output for labelling based at least in part on a combination of the first decision output and the updated decision output;

based at least on the automated labeling, automatically updating, by the processing resource, a pre-trained model by appending the newly labelled decision outputs to a labelled training dataset to create an augmented dataset and retraining the pre-trained model using the augmented dataset to protect against temporal shifts in data, thereby increasing a longevity of the pre-trained model, wherein the automated labelling and the updating are performed automatically by the processing resource without human review of the selected labelled items; and managing a flow of subsequent data utilizing the pre-trained model.

17. The non-transitory computer readable medium of claim 16, wherein the dataset including the subset of the set of decision outputs further includes a plurality of previously labelled decision outputs.

18. The non-transitory computer readable medium of claim 16, wherein the instructions that when executed by the one or more processing resources further cause the one or more processing resources to:

exclude the second decision output from inclusion in the subset of the set of decision outputs based upon the second confidence value being less than the confidence threshold value.

* * * * *